United States Patent [19]
Segev

[11] Patent Number: 5,566,022
[45] Date of Patent: Oct. 15, 1996

[54] INFRA-RED COMMUNICATION SYSTEM

[76] Inventor: Uri Segev, 13 Hagidonim Street, Zichron Yaakov 30900, Israel

[21] Appl. No.: 258,240

[22] Filed: Jun. 10, 1994

[30] Foreign Application Priority Data

Jun. 11, 1993 [IL] Israel ......................................... 105990

[51] Int. Cl.⁶ ............................ H04B 10/00; H04B 10/02
[52] U.S. Cl. ............................ 359/172; 359/159; 359/176
[58] Field of Search .................................... 359/172, 152, 359/125, 159, 174, 176; 340/825.72

[56] References Cited

U.S. PATENT DOCUMENTS

| | | | |
|---|---|---|---|
| 3,511,993 | 3/1966 | Smokler | 359/172 |
| 3,710,122 | 1/1973 | Burcher et al. | 359/172 |
| 4,402,090 | 8/1983 | Gfeller | 357/137 |
| 4,456,793 | 6/1984 | Baker | 359/172 |
| 4,601,064 | 7/1986 | Shipley | 359/152 |
| 4,680,811 | 7/1987 | Harper et al. | 359/172 |
| 4,709,411 | 11/1987 | Mori | 359/172 |
| 4,727,600 | 2/1988 | Avakian | 359/172 |
| 4,807,222 | 2/1989 | Amitay | 359/172 |
| 4,809,257 | 2/1989 | Gantenbein | 359/172 |
| 4,809,359 | 2/1989 | Dockery | 359/145 |
| 4,864,647 | 9/1989 | Harrington . | |
| 4,882,747 | 11/1989 | Williams | 359/148 |
| 4,882,770 | 11/1989 | Miyahira et al. | 359/172 |
| 4,941,207 | 7/1990 | Maeda et al. | 359/152 |
| 4,959,874 | 9/1990 | Saruta et al. | 359/152 |
| 4,975,926 | 12/1990 | Knapp | 359/172 |
| 4,977,618 | 12/1990 | Allen | 359/159 |
| 4,977,619 | 12/1990 | Crimmins | 359/172 |
| 5,051,601 | 9/1991 | Atobe et al. | 359/152 |
| 5,062,151 | 10/1991 | Shipley . | |
| 5,068,916 | 11/1991 | Harrison et al. . | |
| 5,109,222 | 4/1992 | Welty | 359/142 |
| 5,142,396 | 8/1992 | Divjak et al. | 359/172 |
| 5,142,400 | 8/1992 | Solinsky | 359/172 |
| 5,159,480 | 10/1992 | Gordon et al. | 359/172 |
| 5,191,461 | 3/1993 | Cranshaw et al. | 359/152 |
| 5,218,356 | 6/1993 | Knapp | 359/145 |
| 5,384,652 | 1/1995 | Allen et al. | 359/172 |

Primary Examiner—Wellington Chin
Assistant Examiner—Rafael Bacares
Attorney, Agent, or Firm—Ladas & Parry

[57] ABSTRACT

An infrared communication system includes a plurality of infrared transceivers for receiving and transmitting infrared signals through the free air in which each transceiver includes: an omnidirectional infrared receiver for receiving infrared signals; an omnidirectional infrared transmitter for transmitting infrared signals; and a controller which determines the direction of arrival and the quality of the signals received by the infrared receiver, and controls the respective infrared transmitter in accordance therewith.

11 Claims, 25 Drawing Sheets

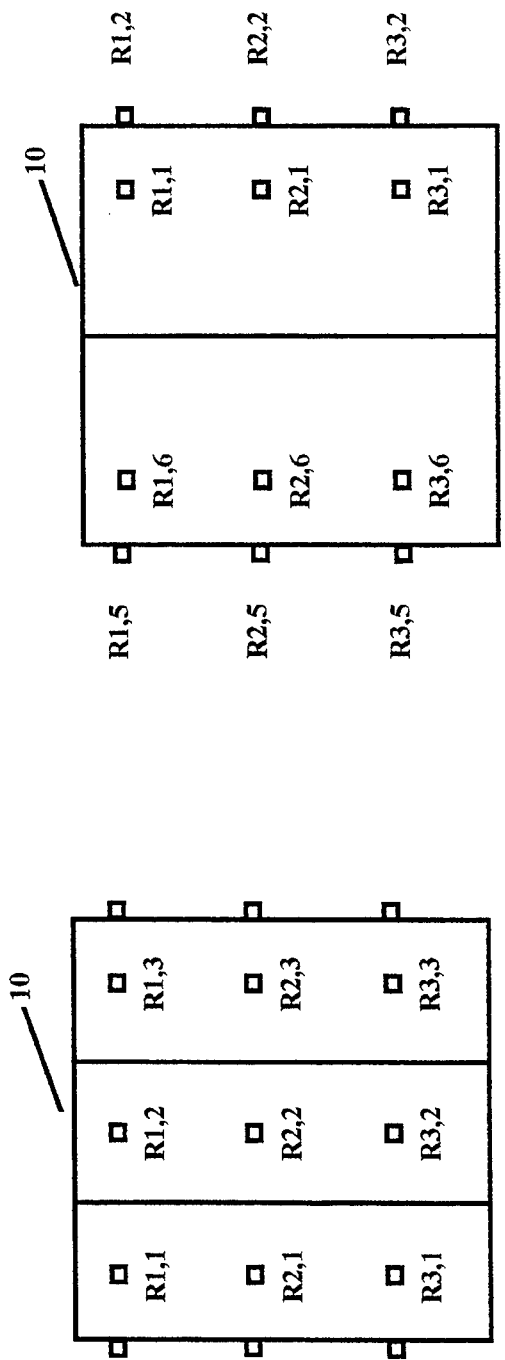
Fig. 6b
Fig. 6a
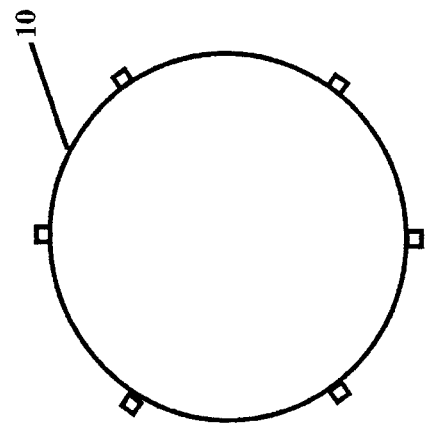
Fig. 6c

| NO. | TIME | SOURCE ID | SECTOR OF INTEREST | ERROR | DIRECTION OF ARRIVAL | TRANSMITTER POWER | TRANSMITTER DIRECTION | ACKNOWLEDGE | QUALITY OF RECEPTION |
|---|---|---|---|---|---|---|---|---|---|
| | | | | | | | | | |
| | | | | | | | | | |
| | | | | | | | | | |

Fig. 17

INFRA-RED COMMUNICATION SYSTEM

FIELD AND BACKGROUND OF THE INVENTION

The present invention relates to an infrared communication system, and particularly to a wireless system including a plurality of relay units for receiving and transmitting infrared signals through free air.

Infrared communication systems commonly include optical fibers for establishing communication between various terminals of the system. However, there are many situations wherein it is desirable to connect the various terminals in a fiberless manner, i.e., via free air and not via optical fibers. The ability of one terminal, in a fiberless infrared communication system, to correctly intercept a message transmitted by another terminal depends on receiver dependent factors, transmitter dependent factors, and medium dependent factors. The receiver dependent factors include, among others, the sensitivity and radiation acceptance angle of the receiver. The transmitter dependent factors include, among others, the radiation intensity and the radiation pattern. The medium (and system) dependent factors include, among others, the distance between the receiver and the transmitter, the position (stationary or dynamic) of one relative to the other, the presence or absence of a line of sight between the two, obstructions in the path of the radiation, and reflections suffered by the radiated signal in its way to the receiver.

A typical infrared communication system includes infrared LEDs (light-emitting diodes) as emitters, and photodiodes as receptors. However, generally such emitters and receptors have disadvantageous characteristics particularly when used in a fiberless (i.e., through free air) infrared communication system, such as limited emission-reception angles, limited switching speed, and high power demands. These disadvantageous characteristics make the use of conventional emitters and receptors of the foregoing type impractical in many or most cases for portable, reliable, and relatively inexpensive fiberless infrared communication systems.

OBJECTS AND BRIEF SUMMARY OF THE INVENTION

An object of the present invention is to provide an infrared communication system having advantages in one or more of the above respects.

According to one aspect of the present invention, there is provided an infrared communication system including a plurality of infrared transceivers for receiving and transmitting infrared signals through the free air, each of the transceivers comprising: an omnidirectional infrared receiver for receiving infrared signals; an omnidirectional infrared transmitter for transmitting infrared signals; and a controller including signal direction-of-arrival determining means for determining the direction of arrival and the quality of the signals received by the infrared receiver, and direction controlling means for controlling the respective infrared transmitter in accordance therewith.

According to further features in the preferred embodiment of the invention described below, the controller controls both the direction and the power of the infrared radiation transmitted by the transmitter in accordance with the statistics of the direction of arrival and the quality of the infrared signals received by the receiver in the respective transceiver.

According to still further preferred features, the controller further includes: means for detecting the destination of the infrared message to be transmitted by the transmitter in the respective transceiver; means for recording the direction of arrival, quality and originator identity of formerly received messages; means for comparing the originator identity of each received infrared message with all the previously-recorded originator identities for the respective transceiver; and means for controlling the transmitter in the respective transceiver such that when the destination of an outgoing message matches the originator of one of the previously-recorded messages, the transmitter is caused to transmit unidirectionally in the direction corresponding to the matched previously-recorded originator; and when the destination of an outgoing message does not match one of the previously-recorded originators, the transmitter is caused to transmit omnidirectionally.

According to another aspect of the present invention, there is provided a wireless infrared communication system comprising: a plurality of relay units; a plurality of electrical devices each equipped with infrared communication means for communicating directly with the relay unit in its vicinity; each of the relay units including a high baud rate infrared transceiver for communicating with its adjacent relay units, and a low baud rate infrared transceiver for communicating with each of the electrical devices in its vicinity.

According to a still further aspect of the present invention, there is provided a wireless infrared communication system comprising a plurality of relay units each having means for identifying the respective unit; a plurality of electrical devices, each having means for identifying the respective device, and each equipped with infrared communication means for communicating directly with the relay unit in its vicinity; each of the relay units including: an infrared transceiver for transmitting and receiving information with respect to adjacent relay units in the system and with respect to each of the electrical devices in its vicinity; and processing means for processing the information to maintain an updated topological map of the communication system, including the identification of all the relay units in the system, of the adjacent relay units, of the electrical devices in its vicinity, and of the electrical devices in any other relay unit's vicinity.

More particularly, the procesing means of each relay unit continuously: (a) monitors its own topological map and updates it whenever there is a change in the quality factor in the reception of a specific electrical device in its vicinity, or a new device is determined to be in its vicinity, or a known device disappears from its vicinity; (b) conveys information on those changes to all other relay units on the network; (c) receives reports on changes of the same nature detected by other relay units; an (d) analyzes locally detected changes together with other relay units' reported changes to obtain a topological virtual image of all the devices hooked to the network including each device's assignment to a particular relay unit.

As will be described more particularly below, the communication system may be used for communicating all types of information, including control, data, voice, compressed video, etc; and the types of electrical devices that may be included in the communication system include a wide variety of electrical devices, including controlled device (e.g., an electrically-controlled light, oven, etc.), sensors (e.g., smoke, fire, temperature, etc.), computers and peripherals, telephones, intercoms, pagers, video cameras, etc.

Communication systems constructed in accordance with the foregoing features provide a number of important advantages, including efficient energy utilization, mobility, compatibility with several communication standards, expansibility and autonomous operation.

Further features and advantages of the invention will be apparent from the description below.

BRIEF DESCRIPTION OF THE DRAWINGS

The invention is herein described, by way of example only, with reference to the accompanying drawings, wherein:

FIGS. 6a, 6b and 6c are front, side and top views, respectively, illustrating the three-dimensional array of infrared signal receptors included in the receiver of FIG. 5;

FIG. 17 illustrates the transceiver database format;

DESCRIPTION OF A PREFERRED EMBODIMENT

Overall System

Figure 1:
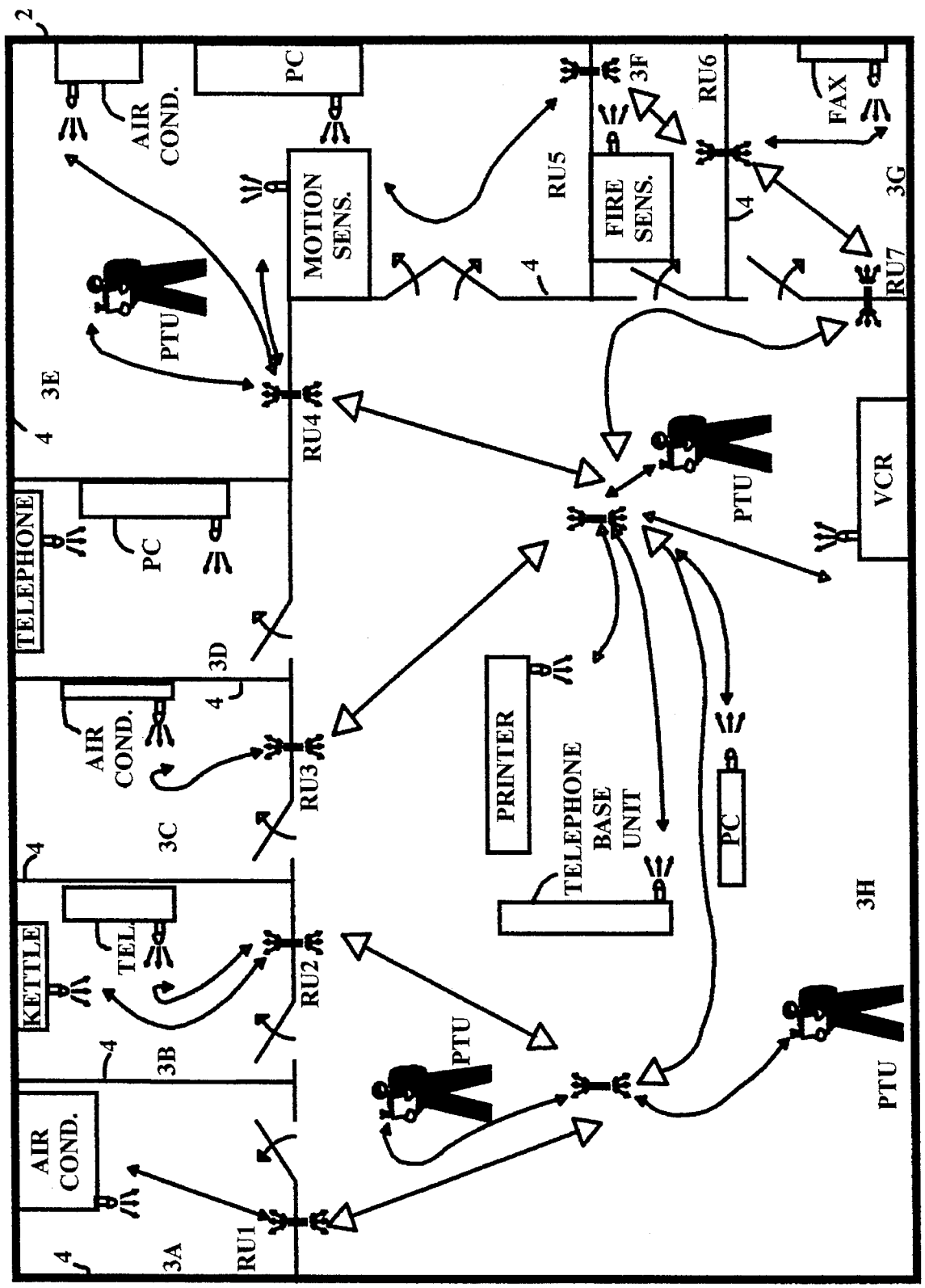
FIG. 1 pictorially illustrates one form of fiberless infrared communication system constructed in accordance with the present invention.

The fiberless infrared communication system pictorially illustrated in FIG. 1 is a cellular communication and control system in which various devices, such as sensors and telephones, appliances, may be controlled and accessed throughout a building. The system additionally includes detectors for detecting various conditions within the building, such as fire or burglary, and for actuating an alarm or executing a control function in response to detecting any of such conditions. The infrared system also includes infrared fiberless telephone communication enabling voice communication and paging to be made at any location within the building structure via the fiberless communication system.

More particularly, the system pictorially illustrated in FIG. 1 is in a building structure, generally designated 2, divided into a plurality of rooms 3A–3H by means of walls 4. One or more of the rooms may include: a fire and/or smoke detector device FSDU for detecting fire or smoke in the respective room; an appliance control device ACD for controlling an appliance, such as a light, air conditioner, kettle, etc., in the respective room; and a telephone base device TBD connected to the standard telephone communication system. Each of the above devices includes an infrared fiberless transceiver to permit remote communication with the respective device. The system illustrated in FIG. 1 further includes a portable control device PCD carried by a user also equipped with an infrared fiberless transceiver, enabling such user to remotely communicate with each of the devices, e.g., to control appliances in the building from a remote location, to monitor sensors spread throughout the building, as well as to communicate with the outside world via the telephone base device TBD.

Figure 2:
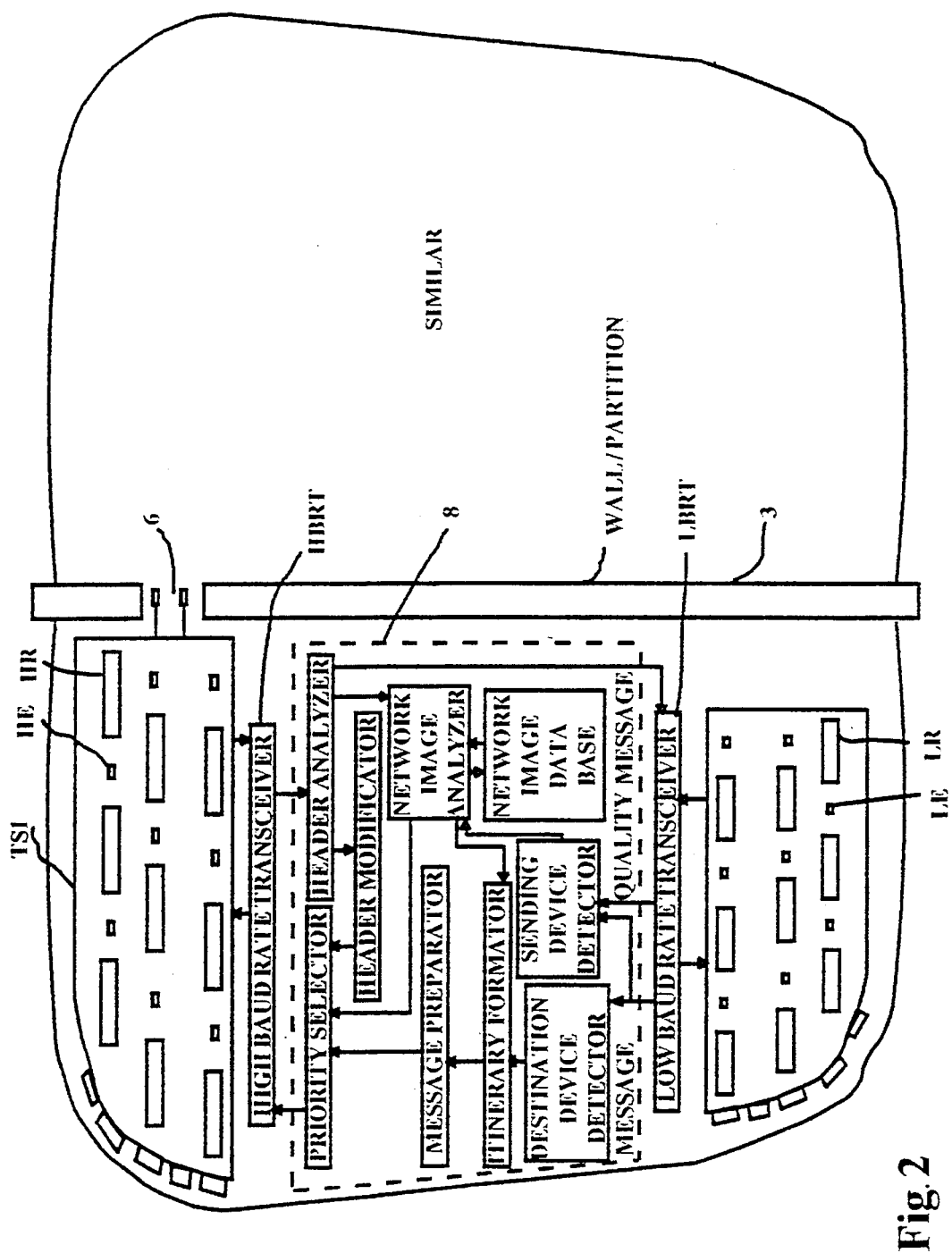
FIG. 2 diagrammatically illustrates the main components in one of the relay units in the infrared communication system of FIG. 1.

Communication between the above components of the communication system is effected optically between the various rooms 3A–3H of the building structure 2 via the air rather than via optical fibers. For this purpose, the infrared communication system illustrated in FIG. 1 includes a plurality of relay units $RU_1$–$RU_{10}$, e.g., mounted in the walls 4 of the building structure 2, for receiving and transmitting the infrared signals in and out of rooms 3A–3H via free air. As shown in FIG. 2, each relay unit RU includes a transceiver section $TS_1$ on one side of the wall, and a transceiver section $TS_2$ on the opposite side of the wall, with any suitable communication 6 between the two sections through the wall. The communication 6 through the walls may be by wire, IR, RF, ultrasonic, etc., links.

The relay units RU are designed for transmission and reception of IR messages in the ranges of up to about fifteen meters, so that, in most cases, one relay unit would be provided in each room and its surroundings would constitute one cell in the communication network. However, in particularly large rooms, such as indicated by room 3H in FIG. 1, a plurality of relay units RU may be provided (three being shown in room 3H); the surroundings of each relay unit, however, would still consitute one cell in the communication network.

As shown in FIG. 1, room 3D is not provided with a relay unit, and therefore that room is not within the communication network. If it is desired to add that room to the communication network, it is only necessary to provide the room with a relay unit. It will thus be seen that the area covered by the communication network can be easily increased or decreased, as desired.

As shown in FIG. 2, each of the two sections $TS_1$, $TS_2$ of each relay unit RU includes a high baud rate transceiver HBRT for transmitting data beween the relay units RU of the various cells, and a low baud rate transceiver LBRT for transmitting data from a relay unit to the devices in its respective cell. Each of the devices equipped for fiberless infrared communication is provided with a low baud rate transceiver LBRT. For example, the high baud rate transceiver HBRT for transmitting the data in an intercell manner may operate at a baud rate of the order of 2 Mbit/sec; whereas the low baud rate transceiver LBRT for transmitting the data in an intracell manner may operate at a rate of the order of 150–200 Kbit/sec. The two transceivers HBRT and LBRT are interconnected by processing circuitry, generally designated 8, which facilitates functions at the message and network levels, as to be described more particularly below with respect to FIG. 14.

The high baud rate transceiver HBRT includes a transmitter/receiver head HH, constituted of a three-dimensional array of emitters HE and receptors HR for transmitting and receiving optical signals at a high baud rate. Similarly, the low baud rate transmitter LBRT also includes a transmitter/receiver head LH, constituted of a three-dimensional array of emitters LE and receptors LR for transmitting and receiving optical signals at a low baud rate. The arrangement of the receptors and emitters in each of the two heads HH and LH is described more particularly below with respect to FIGS. 6 and 11, respectively.

Figure 3:
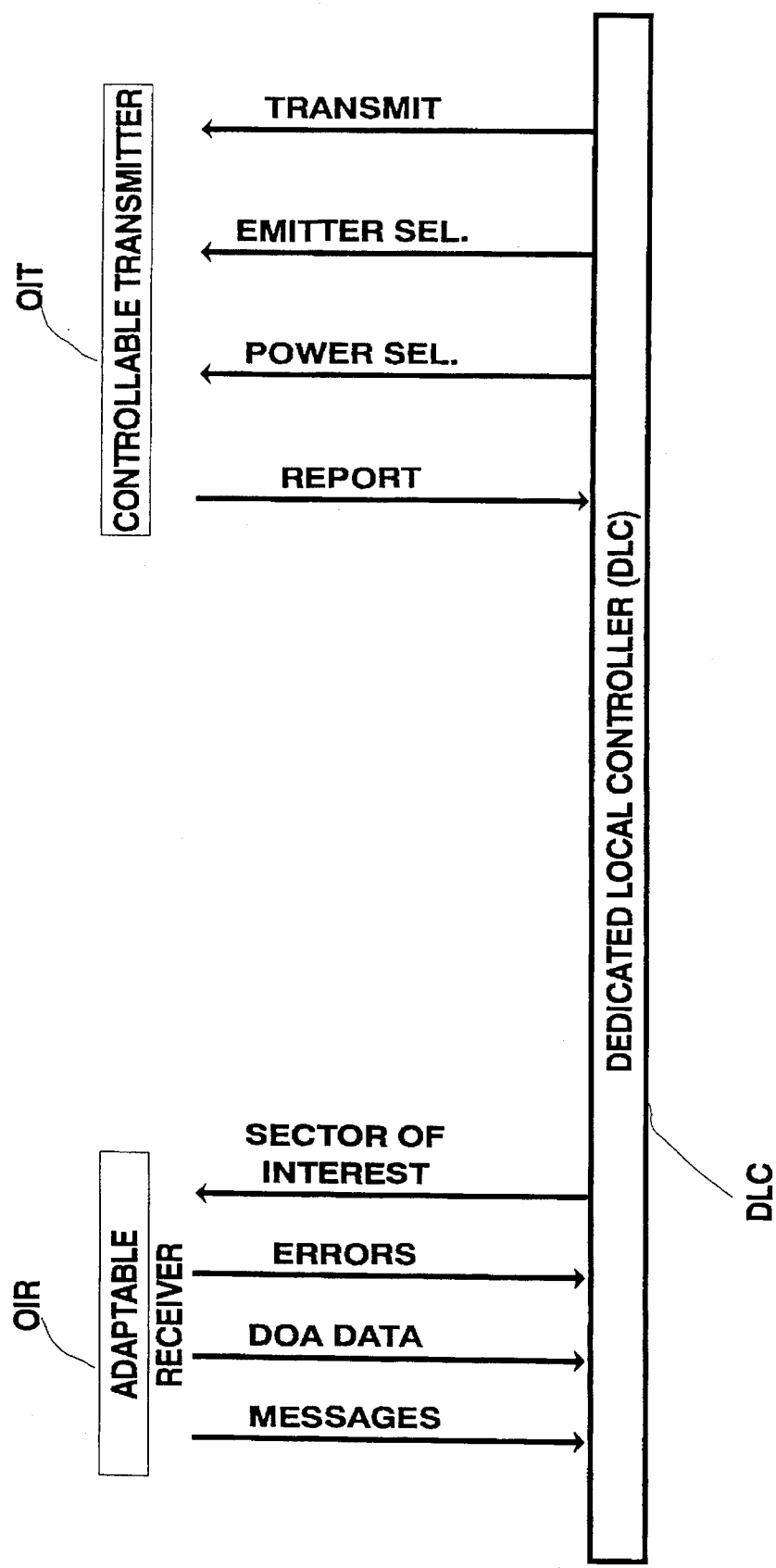
FIG. 3 is a block diagram illustrating the main elements of a transceiver in each of the relay units of FIG. 2.

FIG. 3 more particularly illustrates the general construction of each of the HBRT and LBRT transceivers. Each includes an omnidirectional infrared receiver OIR for receiving infrared signals, an omnidirectional infrared transmitter OIT for transmitting infrared signals, and a dedicated local controller DLC for determining the direction of the signals received by the respective infrared receiver and for controlling the respective infrared transmitter.

As will be described more particularly below, each relay unit RU is a totally autonomous entity controlling and monitoring the device in its respective cell. Each relay unit RU includes a three-dimensional high baud rate transceiver HBRT and a three-dimensional low baud rate transmitter LBRT with a dedicated local controller DLC for each, and the relevant interconnection circuitry. There is no central controller or computer that coordinates the activities of all the relay units. Each relay unit includes its own identification number, as does each device equipped to communicate over the fiberless communication network. All the relay units build and maintain an accurate list of all the devices that participate in the network. Thus, each relay unit monitors all the IR transmissions in its surroundings, and based on the quality and direction of the transmissions it intercepts, it builds internally a list of locally intercepted devices (LLID) that are present in its cell and updates it periodically. Each relay unit also maintains a list of globally interceptor devices (LGID) constituted of the LLID lists of all the relay units in the network.

Since each relay unit is thus autonomous and is not contolled by a central controller or computer, the communication network may be easily expanded or decreased, as desired, by the addition or removal of relay units to thereby add or subtract the number of cells in the network. In addition, devices within the network can also be added or removed and moved to other locations. As will be described more particularly below, such changes in the network are automatically sensed by the relay units within the network and adapt themselves autonomously to such changes such that the changes are transparent to the user.

Figure 4:
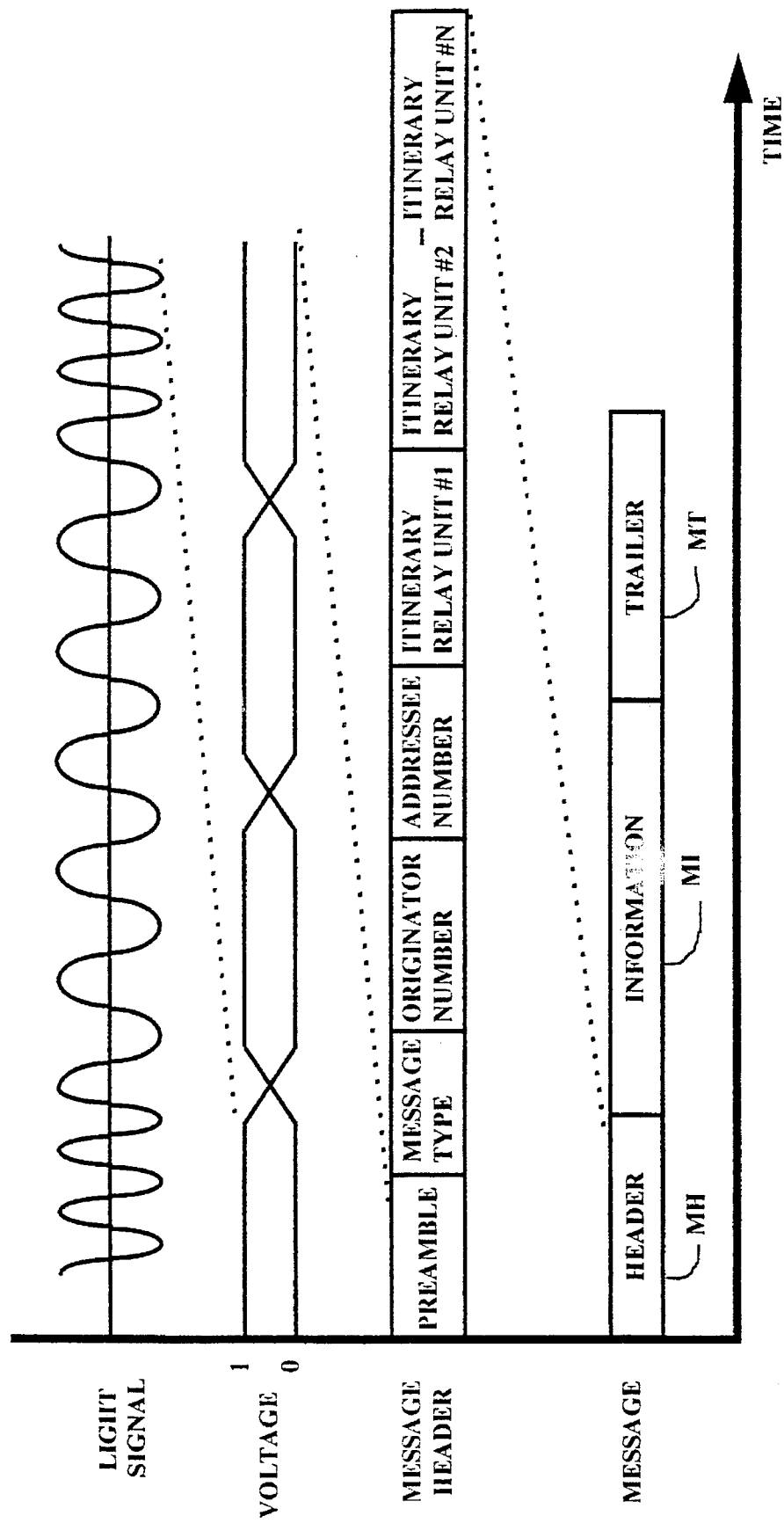
FIG. 4 illustrates the general construction of messages that are handled by the transceivers.

FIG. 4 illustrates the general construction of the messages that are handled by the transceivers.

The basic message M is constituted of digital data arranged in three main sections, namely: a header section $M_H$, an information section $M_I$, and a trailer section $M_T$. These sections are shown in the bottom diagram of FIG. 4.

As shown in the next higher diagram of FIG. 4, the header section $M_H$ contains a fixed preamble used for receivers to synchronize on the message upon reception. This is followed by other data of administrative character including message type, the originator number, addressee number and itinerary number. This data changes from messsage type to message type, as will be described more particularly below.

The information section $M_I$ contains the data that is to be transferred to the addressee. The trailer section $M_T$ contains a CRC code (Cyclical Redundancy Code) used for the detection of the transmission/reception errors, and also an End-of-Message distinct code delimiter.

Within the transceivers, the messages are presented in digital form, e.g., a succession of high and low voltage levels, as indicated by the voltage diagram V in FIG. 4. In the transmitter, this voltage level succession is used to modulate an array of IR LEDs according to some well known encoding method, e.g., FSK (frequency-shift keying), to produce a modulated light signal LS, as shown in the topmost diagram in FIG. 4. This light signal, upon reception by a receiver, is decoded and transformed back to its digital form.

The Omnidirectional Receivers (OIR)

Figure 5:
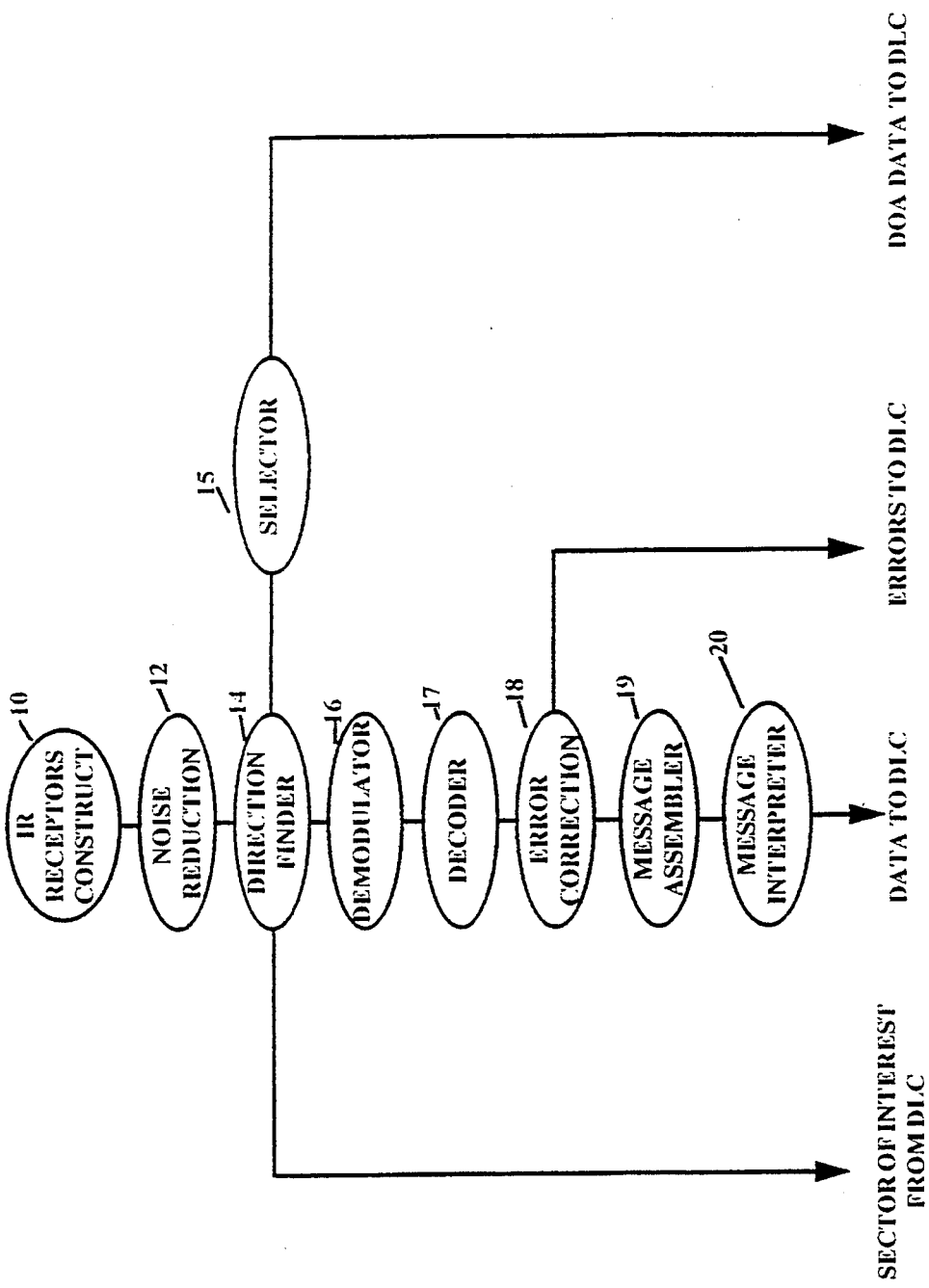
FIG. 5 is a block diagram illustrating the construction of the receiver in each transceiver of FIG. 3.

FIG. 5 is a flow chart illustrating the overall operation of each omnidirectional receiver OIR. Each receiver includes an array of signal receptors, generally designated 10, which feed their output to a noise reduction circuit 12 to filter the noise therefrom and to amplify the signal, and then to a direction finder circuit 14. The latter circuit determines the direction of arrival of the received signal and transmits this information to the dedicated logic controller DLC, for registration purposes. The received data is demodulated (block 16) and then decoded (block 17). It is then subjected to an error correction process (block 18), and to message formation process (block 20) before being fed to the dedicated local controller DLC.

FIGS. 6a–6c are front, side and top views, respectively, illustrating a cylindrical construction containing the array of receptors R, generally designated 10 in each of the heads HH and LH of FIG. 2, to permit the receiver to receive the infrared signals from most directions. It is contemplated that other constructions may be used, for example, spherical, planar, etc., best suiting the particular application, in terms of acquired reception, spatial angle, and density of receptors. As shown in FIGS. 6a–6c, the receptors R are IR radiation-sensitive diodes arrayed in three horizontal rows and six vertical columns spaced equally around the circumference of a cylinder. The output of each receptor is thus proportional to the amount of infrared radiation it receives.

Figure 7:
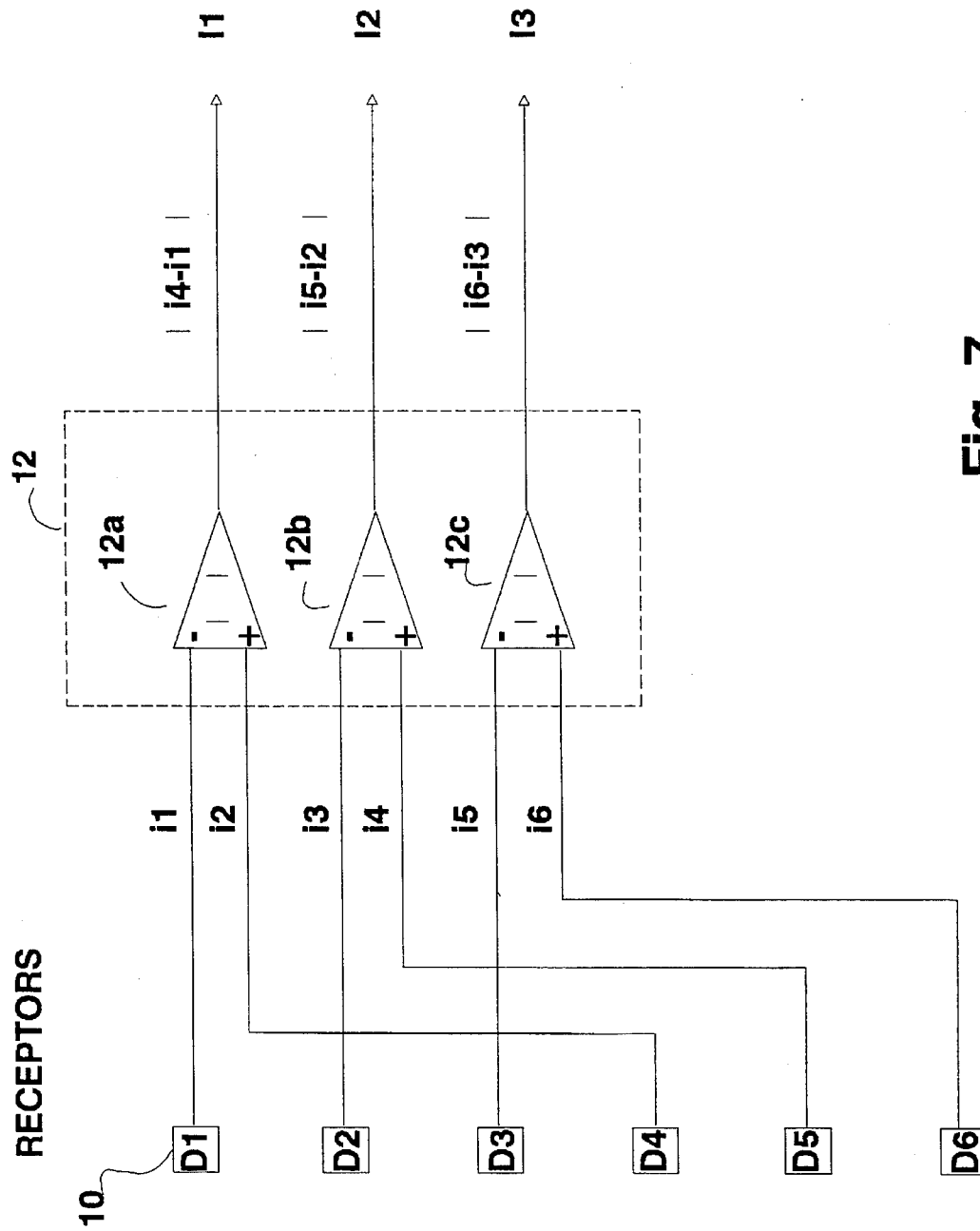
FIG. 7 is a block diagram illustrating the noise-reduction system in each receiver.

FIG. 7 illustrates the noise reduction circuit 12 (FIG. 5) for maximizing the signal while minimizing the noise in order to produce a maximum signal-to-noise ratio. This illustration refers to a particular array of six receptors each oriented in directions of 60° from each other. As shown in FIG. 7, the noise reduction circuit 12 includes a plurality of differential circuits 12a–12c each connected to oppositely-oriented recep tors in the receptor array. Thus, as shown in FIG. 7, the differential circuit 12a receives the outputs of the oppositely-oriented diodes $D_1$, and $D_4$, and sutracts one from the other, to produce an output representing the difference in the amount of IR radiation received by diode $D_1$, subtracted from that received by diode $D_4$. Differential circuits 12b and 12c similarly produce differential outputs of their oppositely-oriented diodes $D_2$, $D_5$ and $D_3$, $D_6$, respectively. Since the noise received by the receptor array is approximately the same in all directions, by thus subtracting the outputs of the oppositely-oriented receptors the noise is minimized without significantly affecting the digital signal which is more directional.

Figure 8:
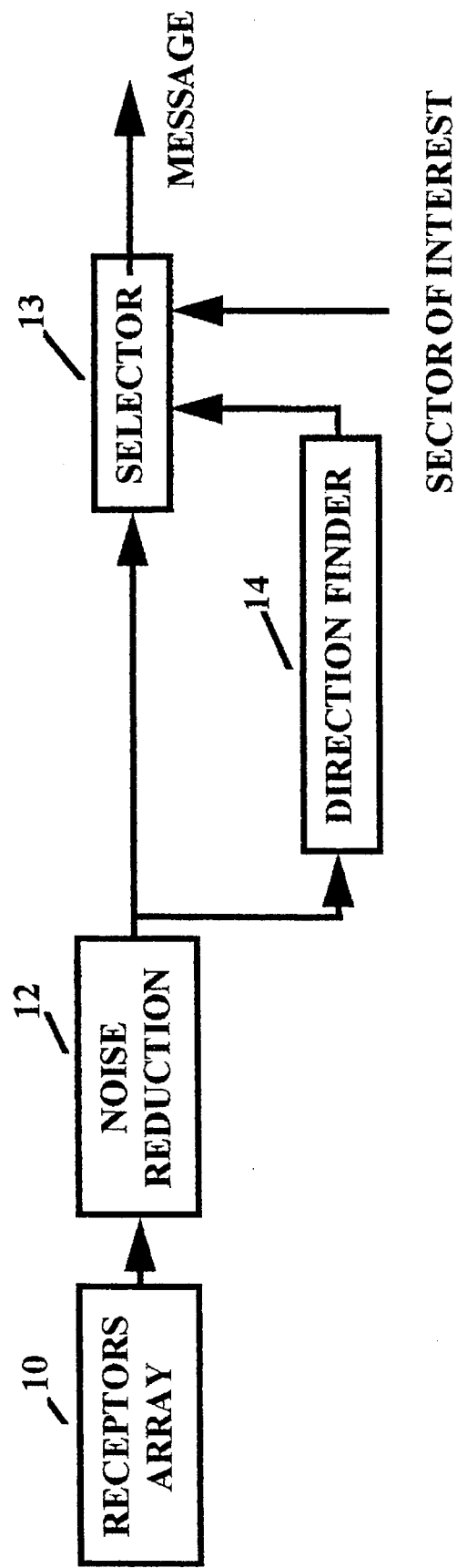
FIG. 8 is a block diagram illustrating the noise-reducing and direction-finding circuit of each receiver.

As shown in FIG. 8, after the received data signals have been processed by the noise reduction circuit 12, they are fed to a selector 13 for further processing just the outputs of the pair of diodes that showed the strongest output, as determined by the direction finder circuit 14.

Figure 9:
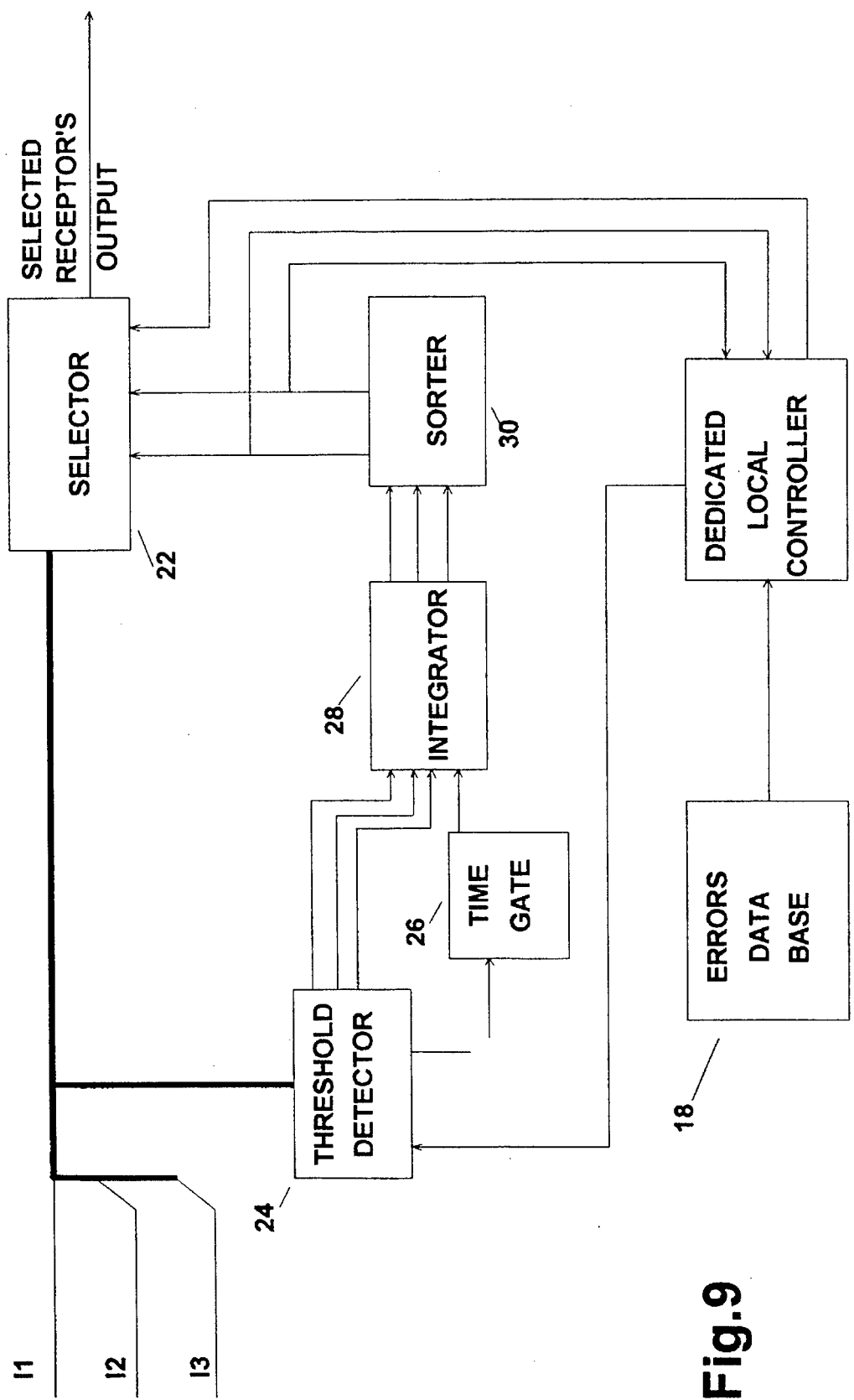
FIG. 9 is a block diagram illustrating the direction finder system in each receiver.

FIG. 9 more particularly illustrates the direction finder circuit 14. Thus, the three absolute values $I_1$–$I_3$ outputted from the differential circuits 12a–12c of the noise reduction circuit 12 are fed to a threshold detector 24 which compares them with a predetermined threshold. A timing gate 26 is triggered by the output of the threshold detector 24 when first receiving an output from one of the differential circuits 12a–12c exceeding the threshold value. The timing gate 26 is effective to pass the outputs of the differential circuits for a predetermined time interval from the time of triggering the timing gate and to block the outputs thereafter. The timing gate 26 thus defines a period identical with the duration of the preamble period in the message construction, as described below with respect to FIG. 4.

An integrators circuit 28 integrates during this time the values received from the three differential circuits 12a–12c via the threshold detector 24 until blocked by the timing gate 26. The integrated values are thus proportional to the energy that arrived in each of the three directions in space from the moment one of the receptor pairs exceeded the threshold value. The integrators operate only while the time gate 26 is open and its input exceeds the threshold value.

The outputs of the integrators 28 are fed to a sorter and maximum detector circuit 30, where the integrator with the highest accumulated value is determined. This determination is applied to the selector 22 which selects the appropriate output signal $I_1$, $I_2$ or $I_3$, for decoding in decoder 16 (FIG. 4) and further processing. The determined direction, as indicated by the selected signal $I_1$, $I_2$ or $I_3$, is also fed to, and is stored in the memory of, the dedicated local controller DLC for the respective transceiver.

As shown in FIG. 5, the output of the direction finder circuit 14, after decoding in demodulator 16 and decoder 17, is fed to an error correction circuit 18. This circuit accumulates error statistics relating to the direction of acceptance of the radiation. Such errors are fed to the dedicated local controller DLC, which controls the direction finder 14 (FIG. 5) to regard only those directions that prove to be efficient based on the error statistics data.

The data signals from the error correction circuit 18 are then fed to the message formation circuit 20, before being supplied as data signals to the dedicated local controller DLC.

The Omnidirectional Transmitters OIT

Figure 10:
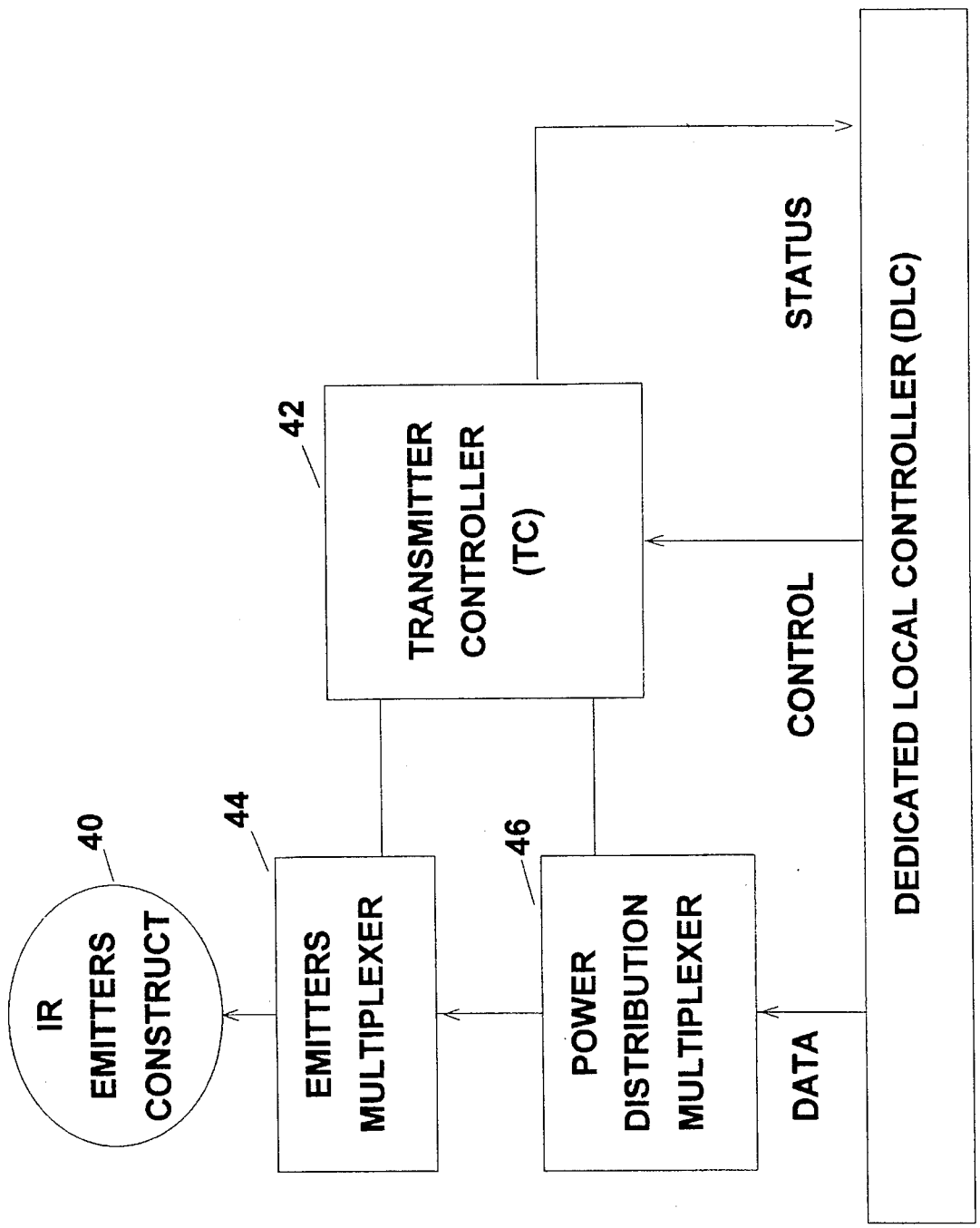
FIG. 10 is a block diagram illustrating a transmitter in each transceiver of FIGS. 2 and 3.

FIG. 10 is a block diagram illustrating a transmitter in each of the transceivers.

Figure 11B:
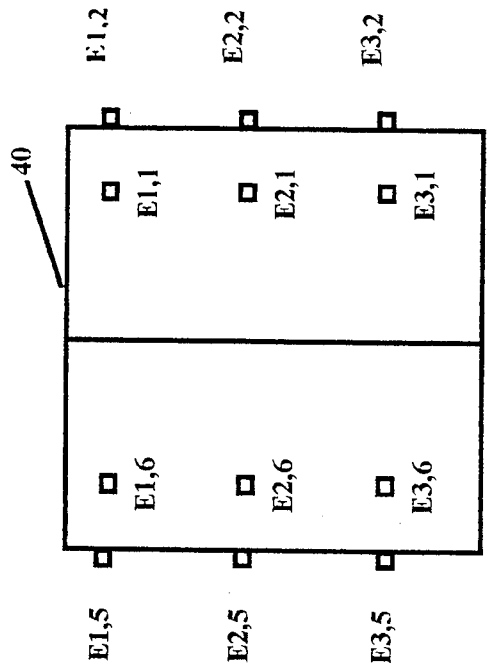
FIG. 11a, 11b and 11c are front, side and top views, respectively, illustrating the three-dimensional array of the infrared signal emitters in the transmitter.
Figure 11A:
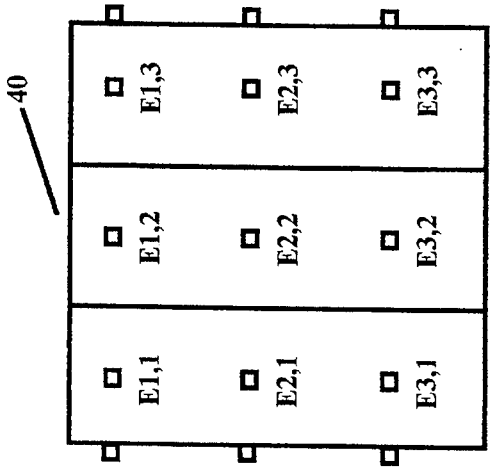
Figure 11C:
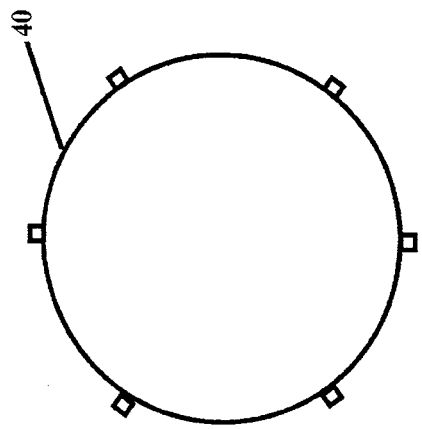

Thus, each transmitter includes a plurality of infrared signal emitters E also arranged in a three-dimensional array 40 in each of the heads HH and LH of FIG. 2 and controlled by the dedicated local controller DLC of the respective transceiver. FIGS. 11a–11c are front, side and top views, respectively of the emitter array, wherein it will be seen that the emitters are also arranged in their respective heads HH and LH in a cylindrical configuration, including three horiozntal rows and six vertical columns spaced equally around a cylindrical surface, as the array of receptors 10 in FIGS. 6a–6c. As in the case of the receptor arrays, the emitter arrays may also be of other configurations, such as spherical, planar, etc.

The respective dedicated local controller DLC provides the direction data to a transmitter controller 42 which determines, at any given time, the amount and combination of emitters to be activated and controls the emitter array 40 via an emitter multiplexer circuit 44. The dedicated local controller DLC also supplies power data to a power distribution multiplexer circuit 46 which determines the power level for the operation of the selected emitters combination, to preserve the pulse load limitation of the components, i.e., to prevent burn-out of a component.

Figure 12:
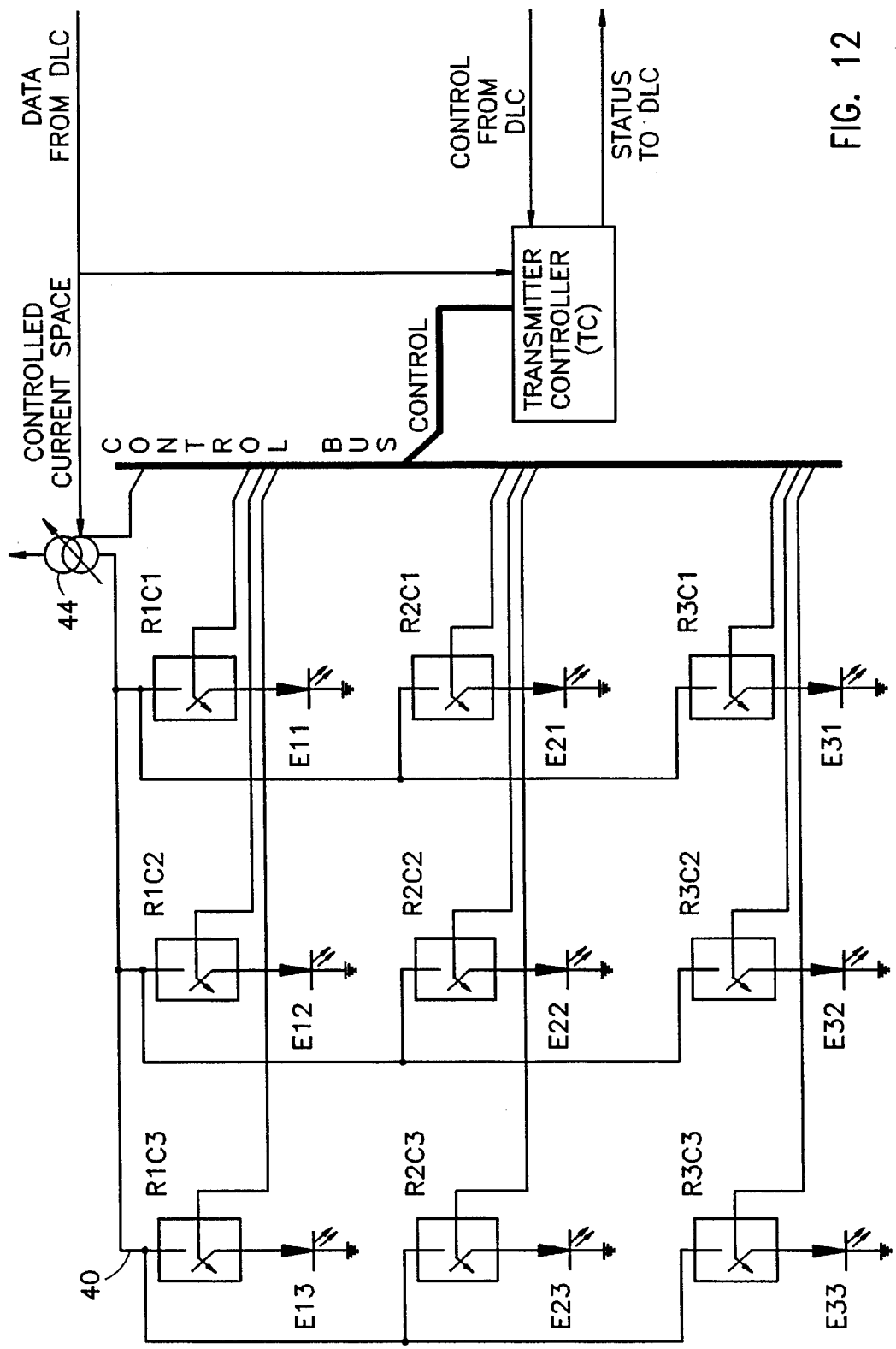
FIG. 12 is a block diagram illustrating the array of emitters, including the power control and switching control thereof.

FIG. 12 illustrates a matrix of emitters included in each transmitter. For simplification purposes, only one-half the matrix is shown, namely one including three horizontal rows and only three vertical columns (rather than six vertical columns as indicated in FIGS. 11a–11c). The emitters in the circuit of FIG. 12 may be selectively energized by controlling their transistors via the transmitter controller circuit 42. The transmitter controller 42 also controls the power levels supplied to the emitters via a controlled current source 44.

The transmitter controller 42 is a pre-programmed unit performing power monitoring on all the emitters, based on the data stream given to the emitters, the power level used, and the direction of radiation required, as supplied by the dedicated local controller DLC of the respective transceiver. The DLC of the transceiver transmits to the transmitter controller 42 data on the next message to be transmitted in advance to its actual transmission. This data determines the direction (i.e., vertical column or sector) of radiation for operation and the power level required. From that moment on, the transmission controller 42 acts independently until instructed otherwise by the dedicated local controller DLC.

The transmitter controller 42 selects the emitters in the matrix 40 to be energized according to the given direction and power requirements, and also according to the maximum permissible pulse load data pre-programmed in it. Thus, the transmitter controller 42 compares the accumulated electrical power applied to the energized signal emitters in the matrix 40 with a permitted maximum, and if exceeded, selects a different combination of signal emitters to be energized.

Figure 13:
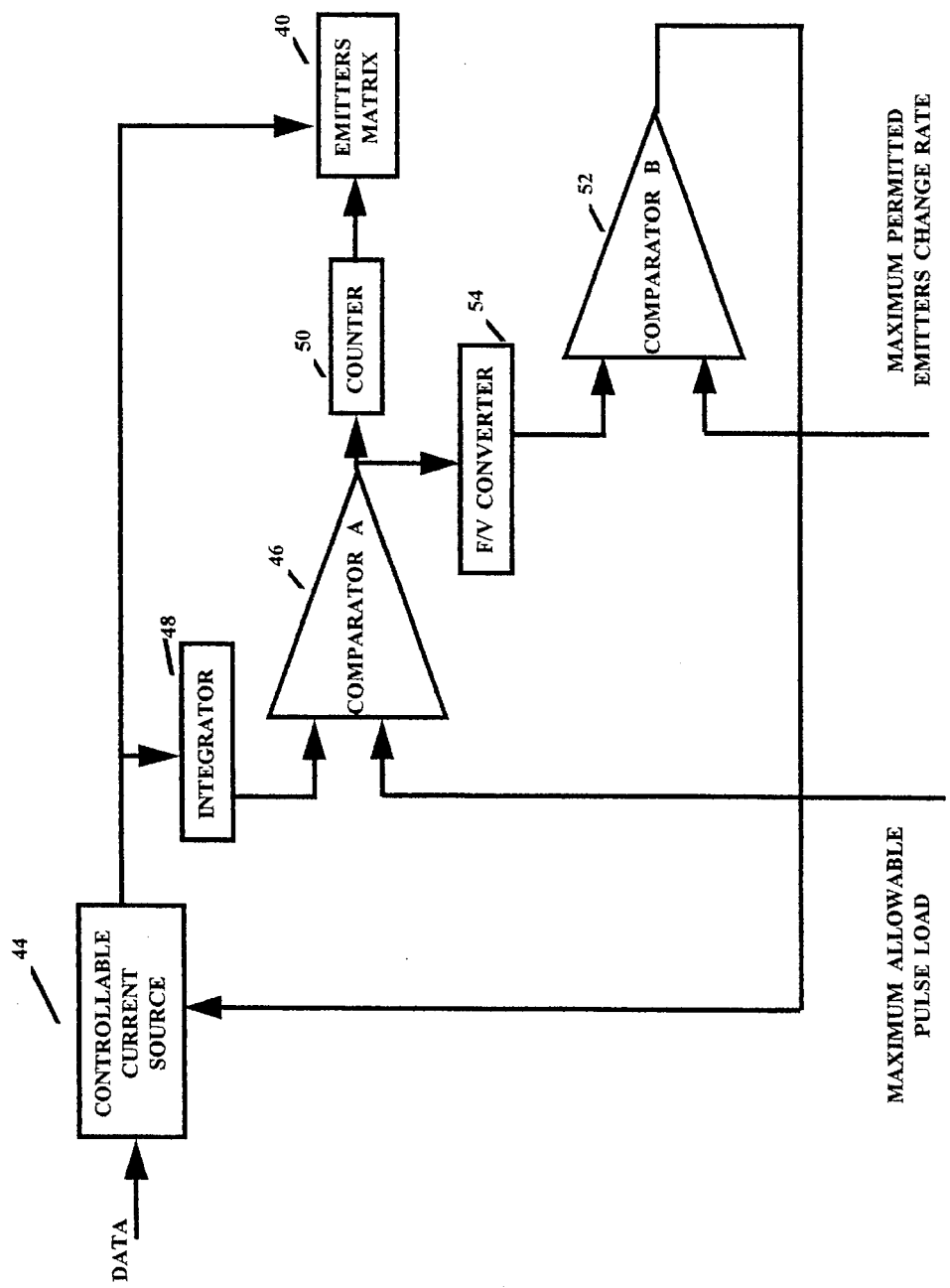
FIG. 13 is a block diagram illustrating the manner of controlling the power output of the emitter array to prevent burn-out.

FIG. 13 more particularly illustrates the manner in which the transmitter controller 42 both selects the emitters within the maxtrix 40 to be energized, and also controls the current source 44 to prevent unduly loading any of the emitters such as might cause burn-out. As shown in FIG. 13, the transmitter controller includes a comparator 46 which receives, as one input, the output of an integrator 48 which reflects the accumulated pulse load upon the active emitter in the matrix. The other input of comparator 46 is a given voltage representing the maximum accumulated pulse load permissible for that emitter. If the pulse load of the emitter exceeds its maximum permissible value, the output of comparator 46 goes high, which thereby applies a clock pulse stepping a counter 50. The counter then selects another emitter in the same sector for operation.

The transmitter controller 42 includes a second comparator 52 which receives, as one input, the output of a frequency/voltage converter 54, outputting a voltage corresponding to the frequency in which comparator 46 goes high, i.e., the frequency at which the counter 50 selects a different emitter in the same sector of the matrix 40. Comparator 52 includes a second input receiving a signal representing the maximum allowable emitter/change rate, which, if exceeded, causes the comparator 52 to go high and thereby to step down the current source 44 to a lower current output.

The Relay Units RU

Figure 14:
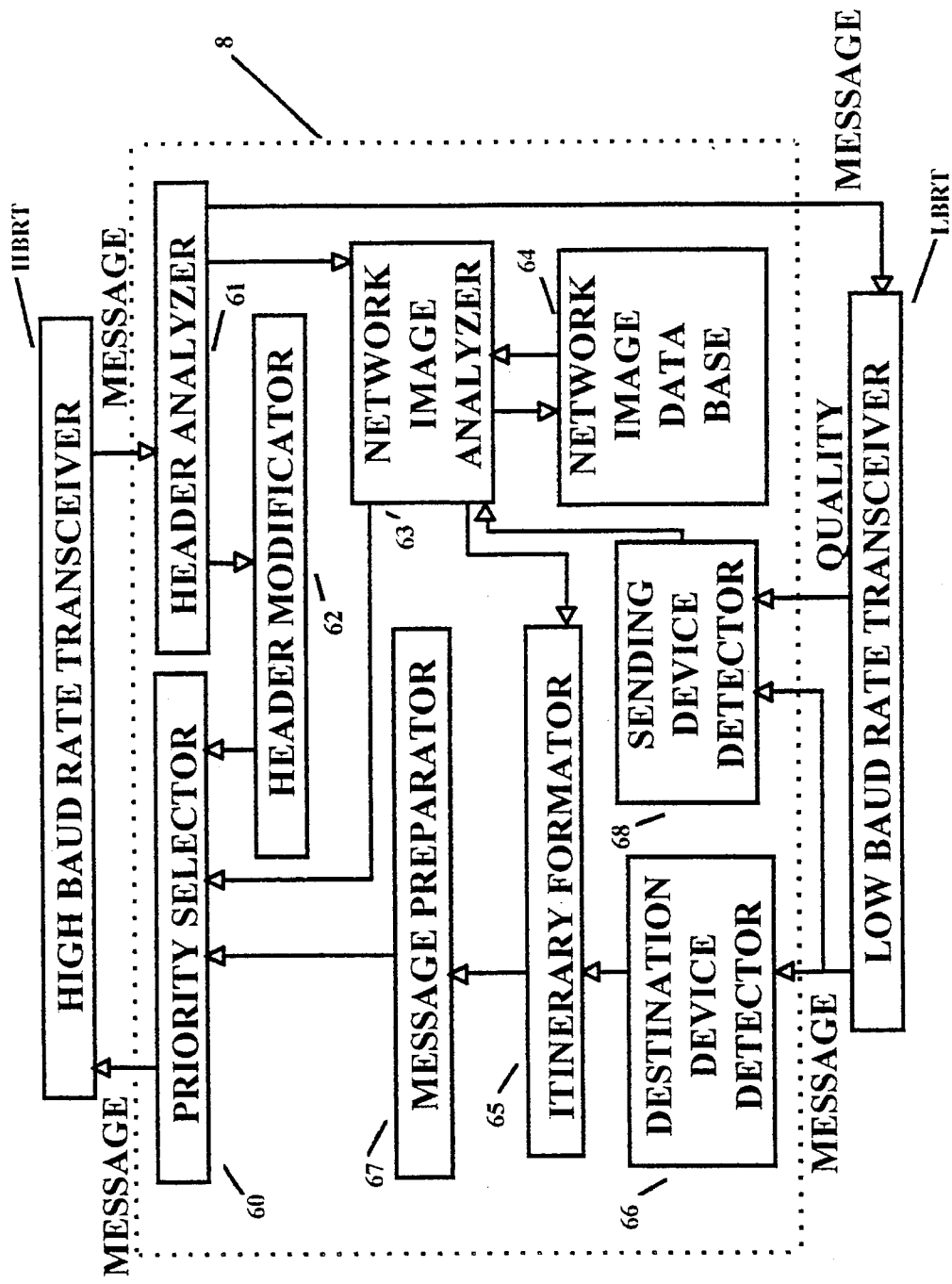
FIG. 14 is a block diagram illustrating the functional system that links the high baud rate transceiver and the low baud rate transceiver included in each relay unit.

As indicated earlier with respect to FIG. 2, each relay unit RU in the communication system includes a high baud rate transceiver HBRT for intercell communication, and a low baud rate transceiver LBRT for intracell communication. The two transceivers are interconected by processing circuitry, generally designated by the block 8 in FIG. 2, which circuitry facilitates the functions at the message and network levels. FIG. 14 more particularly illustrates the processing circuitry included within block 8.

As shown in FIG. 14, processing circuitry 8 includes a priority selector 60, such as a multiplexer, which controls message flow to the high baud rate transceiver HBRT according to a pre-established priorty scheme. The header section $M_H$ (FIG. 4) of the message received by the high baud rate transceiver is analyzed in a header analyzer circuit 61 to determine whether the message is intended for a device within the communication cell of the respective relay unit RU; if so, the message is forwarded to the low baud rate transceiver LBRT of the respective relay unit RU for transmission to the addressed device in that cell.

However, if the message is intended for a device in another communication cell, serviced by another relay unit RU, the message is fed to a header modification circuit 62 for making the appropriate modifications required in the header section $M_H$ of the message before forwarding via the priority selector circuit 60 to the high baud rate transceiver HBRT for transmission to the next relay unit RU.

Processing circuitry 8 further includes a network image analyzer 63, which performs certain analysis and reorganization processes on the messages as will be described more particularly below with respect to FIGS. 20–23. The results of the analysis and reorganization processes are stored in the network image database 64 and are occasionally sent to the other relay units RU for them to create and update the list of locally intercepted devices (LGID), as will be described more particularly below.

The stored results are fed to an itinerary formatter 65. This is a CPU that receives destination information from the low baud rate transceiver LBRT via a destination device detector 66. Upon reception of a message through the LBRT from a device in a relay unit's RU cell addressed to a device in the cell of another relay unit, the itinerary formatter 65 utilizes the destination information received from a destination device detector 66, and the information stored in the database 64, and controls a message preparator circuit 67 to produce the appropriate message header $M_H$ to be transmitted by the high baud rate transceiver HBRT to the appropriate relay unit RU.

The processing circuitry 8 illustrated in FIG. 14 further includes a circuit 68 which receives, from the low baud rate transceiver LBRT, a signal indicating the quality of the message. This information is transmitted to the network image analyzer 63, which includes this information in making an analysis of the message as will be described more particularly below with respect to FIGS. 20–23.

Figure 15:
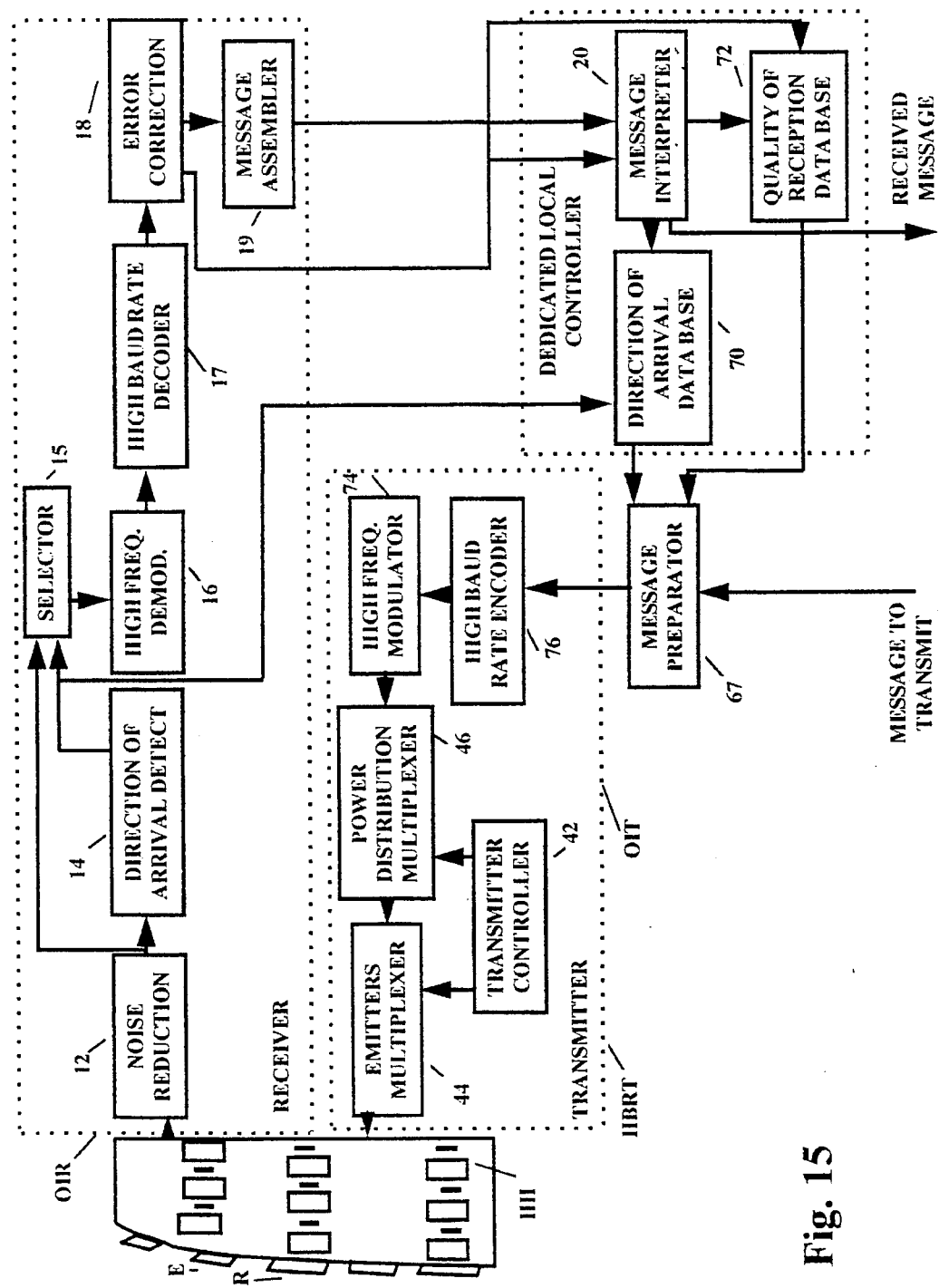
FIG. 15 illustrates the construction of the high baud rate transceiver.

FIG. 15 more particularly illustrates the high baud rate transceiver, including the high baud rate transmitter/receiver head HH, the omnidirectional receiver OIR, and the omnidirectional transmitter OIT, briefly described earlier. Head HH also includes a three-dimensional array of receptors R controlled by the receiver OIR, and emitters E controlled by the transmitter OIT.

As described earlier particularly with respect to FIG. 5, the omnidirectional receiver OIR includes, in addition to the array of emitters E (generally designated 10 in FIG. 5), a noise reduction circuit 12, a direction finder 14, a selector 15, a high frequency demodulator 16, a high baud rate decoder 17, an error correction circuit 18, a message assembler 19, and a message interpreter 20, all as described above with respect to FIG. 5. The receiver OIR thus receives information in the form of successive changes of voltage levels as outputted by the receptors R from the IR radiation intercepted thereby, and performs the above-described noise reduction, direction of arrival detection, demodulation and error correction processes, before feeding this information to the dedicated local controller DLC of the respective transceiver.

The dedicated local controller DLC includes a memory 70 which stores the direction of arrival received from the receiver OIR and supplies this information to the message preparator unit 67 of the processing circuitry 8 in the transceiver as described above with respect to FIG. 14. Controller DLC also includes a memory 72 for storing the quality of reception of the message received from the receiver OIR. This information is also supplied to the message preparator circuit 67.

The transmitter OIT in the transceiver illustrated in FIG. 15 is thus given a message in the form of serial digital data and control data which includes the quality of reception, the recommended direction of transmission, and the recommended transmission power. This information is fed to the transmitter controller 42 which controls the emitter multiplexer 44 to select the emitters to be energized, and also controls the power distribution multiplexer 46 to prevent burn-out of any of the emitters, as described above particularly with respect to FIGS. 10–13. The actual data to be transmitted is conveyed to the power distribution multiplexer 46 via a high baud rate encoder 74 and a high frequency modulator 76 as shown in FIG. 15.

Figure 16:
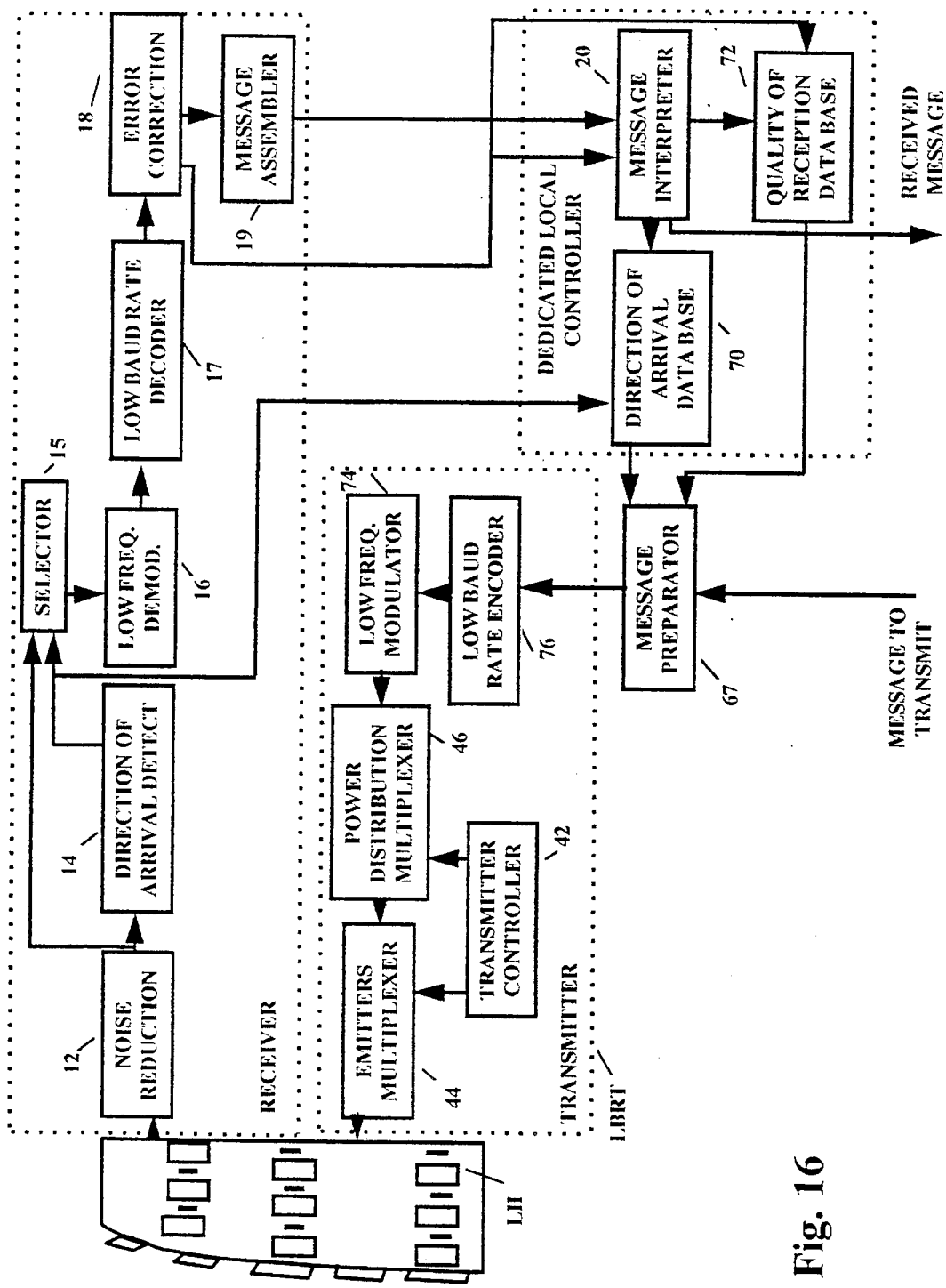
FIG. 16 illustrates the construction of the low baud rate transceiver.

The low baud rate transceiver LBRT is illustrated in FIG. 16. It is functionally identical to the high baud rate transceiver HBRT of FIG. 16, except for the difference in speed (clock rate) employed. Thus, it includes a low frequency demodulator 16' and a low frequency decoder 17' in the receiver section OIR, and a low frequency encoder 75' and low frequency modulator 76' in the transmitter section OIT. In addition, its transmitter/receiver head LH, which includes the three-dimensional arrays of receptors and emitters, is located at the lower end of the relay unit RU to communicate with various devices that most likely will be at a lower height than the relay unit. The transmitter/receiver head HH for the high baud rate transceiver is located at the upper end of the relay unit to communicate with other relay units that will normally be installed high on the walls, at approximately the same height.

In all other respects, the structure and operation of the low baud rate transceiver LBRT illustrated in FIG. 16 are the same as the high baud rate transceiver HBRT illustrated and described above with respect to FIG. 15, and therefore corresponding elements are identified by the same reference numerals to facilitate understanding.

Operation of the Transceivers

As described earlier, the transmitter section and receiver section of each transceiver is controlled by a dedicated local controller DLC. Controller DLC receives the messages from the receiver section, together with pertinent data such as direction of arrival of each reception and any errors that occurred in the reception process, and stores this information in its database. FIG. 17 illustrates the format of the transceiver database in which this information is stored.

Thus, as shown in FIG. 17, the dedicated local controller DLC for the respective transceiver, for each reception, denotes the reception number and time, and extracts the identification of the originator of the received message, error if any, direction of arrival and quality of reception, all as illustrated in FIG. 17. It updates the database by opening a new record for each reception. It also stores, for each transmission, the transmitter power, the transmitter direction, and the acknowledgment.

Figure 18:
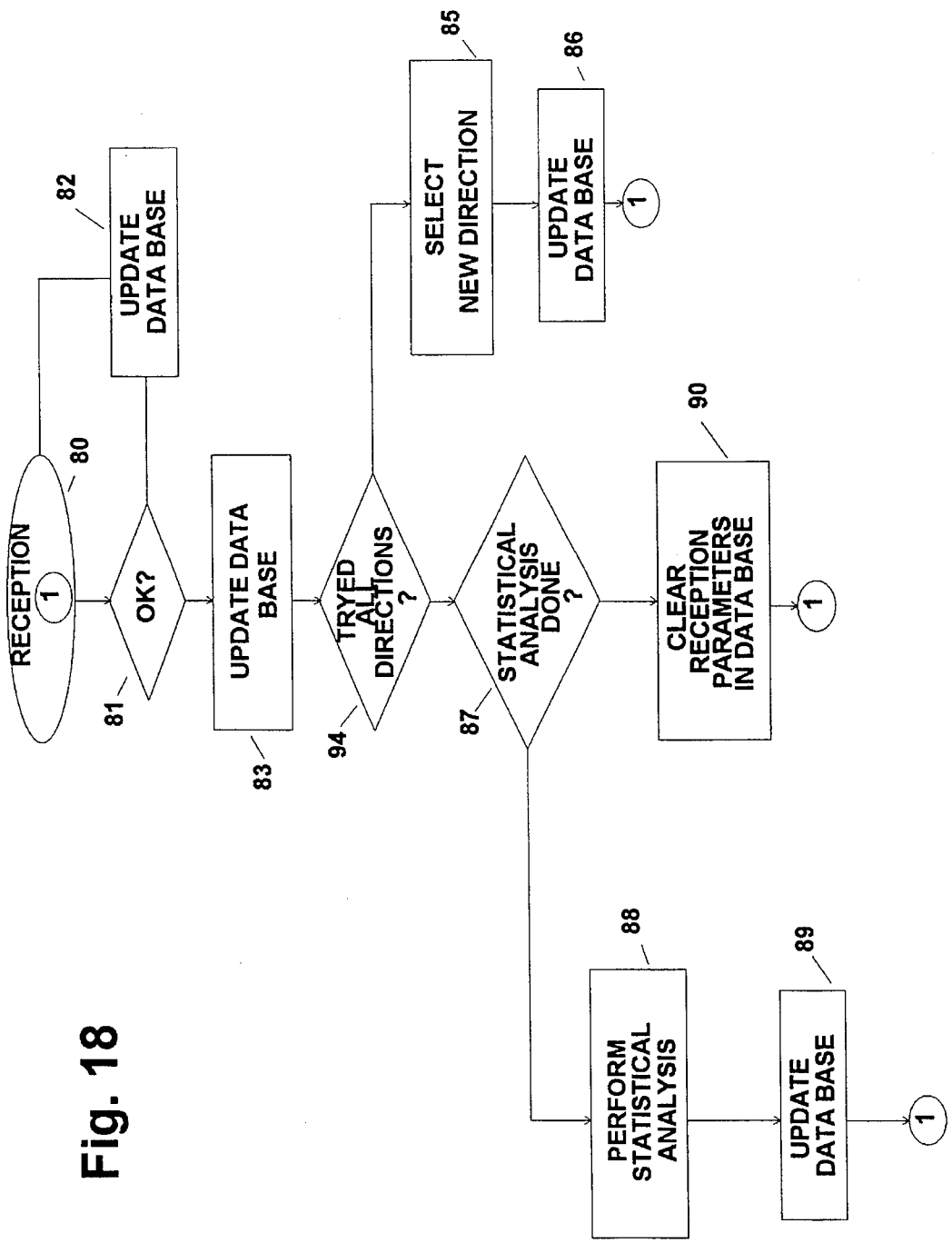
FIG. 18 is a flow chart illustrating the reception control process.

FIG. 18 is a flow diagram illustrating the reception control process. Upon receiving a message (block 80), controller DLC first checks for errors (block 81). If the reception is free of errors, the process continues to the next step which is to update the database (block 82) with the relevant data conferred by the receiver together with the message itself.

If the reception is erroneous, the database is updated, but a process is also started whose goal is to improve the reception. This process sets up the receiver to detect the specific directions for the subsequent receptions, thus gathering information on the quality of reception when the receiver is directional. The database is updated for each new direction selected (blocks 84, 85 and 86).

When all the directions have been tried, a statistical analysis operation begins in which the data is statistically analyzed, marking each direction with a "quality value", indicating the quality of the receptions received. This data is stored in the database (blocks 87, 88, 89). This analysis determines the direction from which a specific transmitter is best received, thus enabling the controller DLC to perform less iterations. After the statistical analysis has been completed and the results stored in the database (blocks 87, 88, 89), the reception parameters are cleared in the database (block 90).

Figure 19:
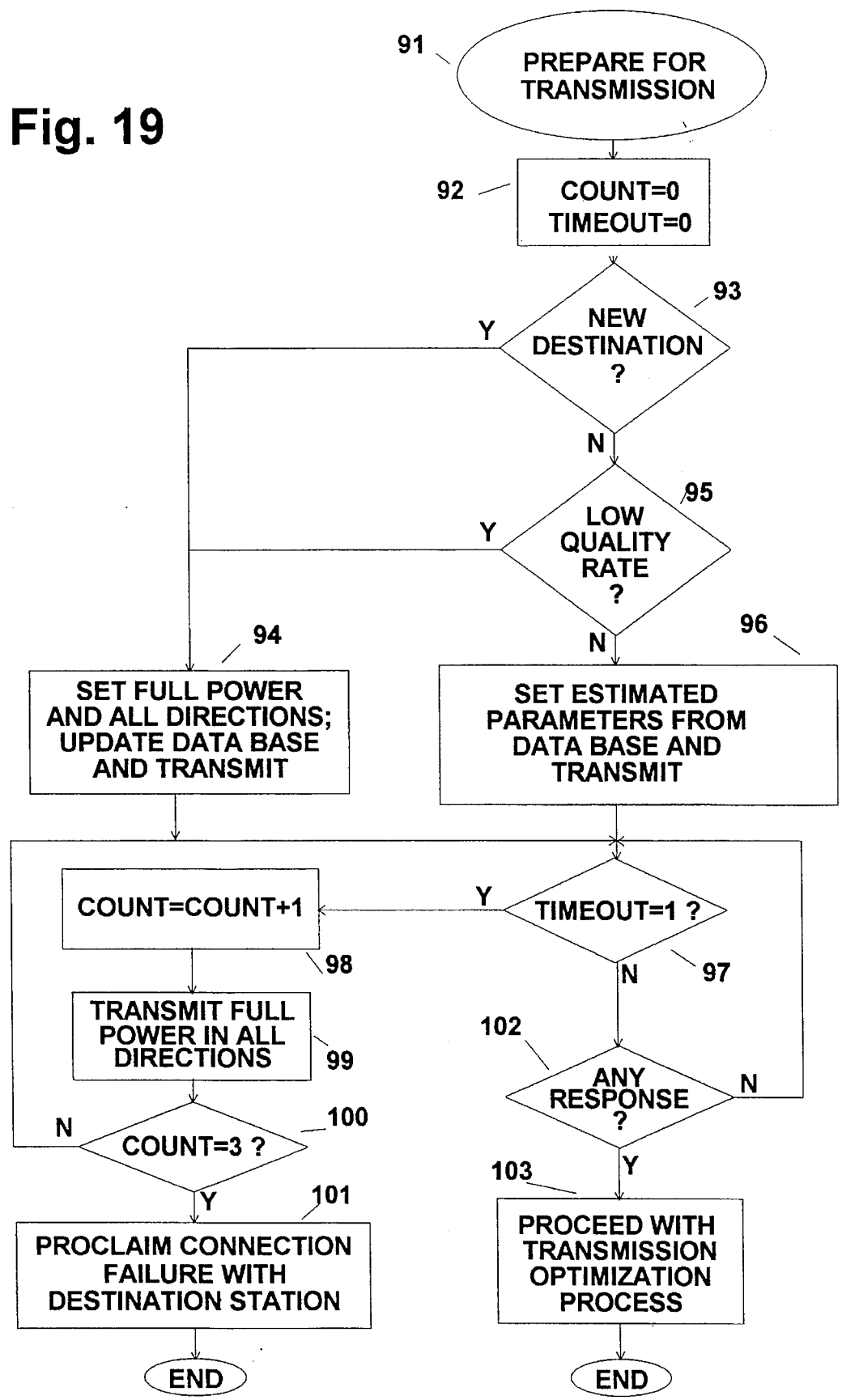
FIG. 19 is a flow chart illustrating the transmission control process.

In parallel with the reception control process illustrated in FIG. 18, the controller DLC also performs the transmission control process as illustrated in FIG. 19. This process is intended to optimize the transmission by using as little energy as possible to transmit a message successfully.

The transmission control process is performed iteratively; its feedback is the Acknowledge message received from the addressee transceiver device. This message is always expected within a specific time span from the moment the preparation for transmission has been completed (blocks 91, 92).

Before a message is issued, the history of receptions from the addressee transmitter is considered so that when a new message is received, a determination can be made whether this is a new destination (block 93); i.e., whether the intercepted transceiver is unknown.

In this respect, if the intercepted transceiver is not previously known (e.g., no record of communication with it exists within the database), this indicates that this is a new destination (block 93); the transmitter is then set for maximum power and omnidirectional configuration (block 94). That is, all the emitters are selected for activation at the maximum power. The same result is produced if the past communication was of low qualtity, i.e., proved to be problematical (block 95).

If the transceiver is known and no communication problems were previously detected in connection with it, then the direction of transmission and the transmission power level are adjusted according to past experience as recorded and reflected in the database illustrated in FIG. 17 (block 96).

Following the transmission, the transmission control process waits for the Acknowledge message, which is expected to arrive within a specified period. If not received within a specified time period, two more transmissions are attempted (blocks 97–100), and if still the Acknowledge message is not received, the transmission control process proclaims a connection failure with the destination station (block 101) and ends the transmission attempt.

When the Acknowledge message is received, the transmitter control processor proceeds with the transmission optimization process (blocks 102, 103) described above.

Network Control

In the infrared communication system illustrated in the drawings, each rerlay unit RU is a totally autonomous entity, controlling the devices in its respective cell, that is, there is no central controller, host, or computer that coordinates the relay units. Rather, each relay unit RU builds and maintains an accurate list of all devices capable of communicating over the network to or from its respective cell.

Each relay unit RU within a cell, and each device within the cell capable of communicating in the network via its respective relay unit RU, has a unique internal number which may be assigned to it at the factory. This number is used in all message transmissions to identify the relay unit RU and the devices serviced thereby. Each active device is handled by one relay unit at any one time. This avoids superfluous repetition of messages and superfluous load on the network.

Figure 20:
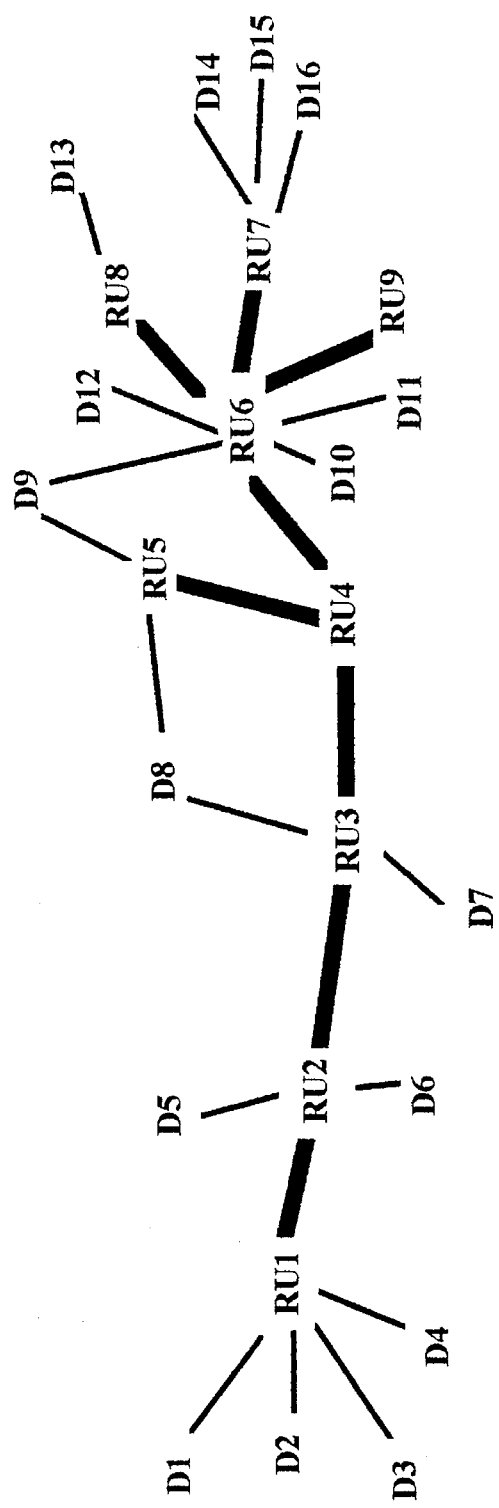
FIG. 20 diagrammatically illustrates an arbitrary fiberless infrared communication network topology.

FIG. 20 illustrates the topology of an arbitrary network constructed of nine relay units $RU_1$–$RU_9$ interconnected over the high baud rate channel, with each relay unit RU servicing any number of (including none) devices $D_1$–$D_{16}$. Thus, the cell serviced by relay unit $RU_1$ includes four devices $D_1$–$D_4$, whereas the cell serviced by relay unit $RU_4$ includes no devices.

As indicated earlier, the major task of the relay units $RU_1$–$RU_9$ is to dispatch messages from one of the devices $D_1$–$D_{16}$ in the network to the other devices in the network as efficiently and quickly as possible. For this purpose, every relay unit RU in the network maintains a topological image of the entire network that will show the interconnections between the relay units themselves, and between the devices serviced by them.

Thus, each relay unit RU monitors all the IR transmissions in its surroundings. Based on the quality and direction of the transmissions it intercepts, it builds internally a List of Locally Intercepted Devices (LLID) that are present in its cell, and updates it periodically. For this purpose, the relay unit RU employs its low baud rate transceiver LBRT to detect the Direction of Arrival of the message, and also to monitor the Quality Factor associated with each reception. The LLIDs of all the relay units RU constitute a List of Globally Intercepted Devices (LGID).

Table 1 set forth below illustrates an example of an LGID, wherein the fragment represented by Item Nos. 34–37 constitute the LLID of relay unit $RU_8$ for an arbitrary network topology.

TABLE 1

| No. | RU No. | Device No. | Qual. Factor | |
|---|---|---|---|---|
| . | 1 | 1 | 6 | |
| . | 1 | 3 | 9 | |
| . | 1 | 4 | 9 | |
| 33 | 7 | 16 | 9 | |
| 34 | 8 | 6 | 3 | Example: LLID |

TABLE 1-continued

| No. | RU No. | Device No. | Qual. Factor | |
|---|---|---|---|---|
| 35 | 8 | 9 | 9 | of RU8 as a |
| 36 | 8 | 5 | 3 | fragment in |
| 37 | 8 | 3 | 4 | the LGID |
| 38 | 9 | 65 | 9 | |
| 39 | 9 | 17 | 9 | |
| 40 | 15 | 601 | 9 | |
| 41 | 15 | 7 | 9 | |
| 42 | 15 | 8 | 8 | |
| 43 | 15 | 53 | 9 | |
| 44 | 15 | 4 | 9 | |
| . | | | | |
| . | | | | |
| . | | | | |
| . | 6 | 9 | 4 | |
| . | 6 | 12 | 9 | |
| | 6 | 10 | 9 | |
| | 6 | 11 | 9 | |

Thus, each relay unit RU continuously monitors its own LLID, and updates it whenever the qualtity factor of the reception of a specific device changes, or a new device is intercepted.

Figure 21:
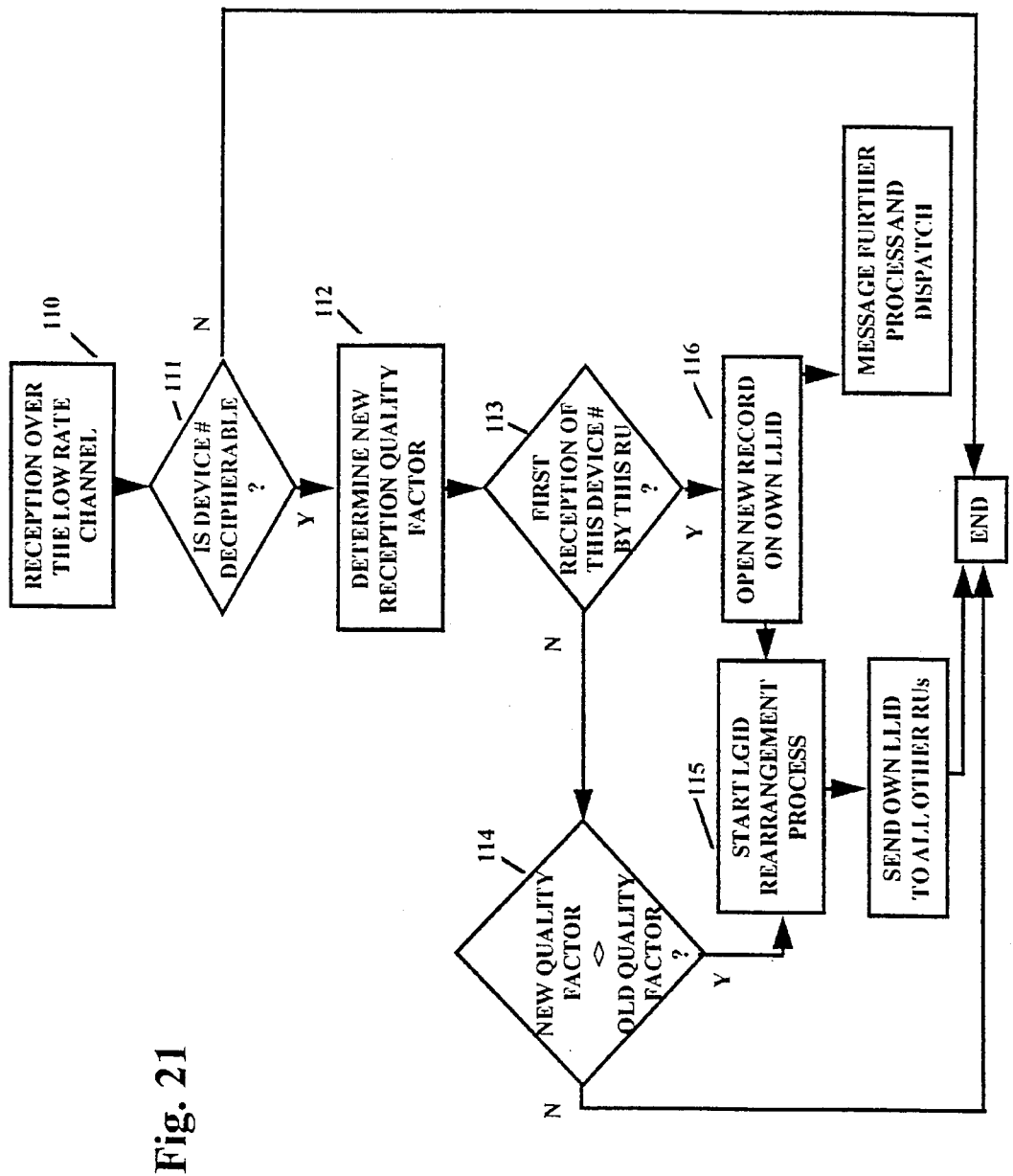
FIG. 21 illustrates the process for updating the list of locally intercepted devices (LLID) during the operation of the communication system.

FIG. 21 is a flow chart illustrating the LLID update process. Thus, upon receiving a message over the low rate channel (block 110), the relay unit RU determines whether the device number is decipherable (block 111). If so, it determines the new reception quality factor (block 112). The relay unit then determines whether this is the first reception of this device number by the respective relay unit (block 113); and if not (i.e., there had been a previous reception of this device number by the respective relay unit RU), a determination is made of whether the quality factor is not equal to the old quality factor (block 114). If so, it triggers the LGID list rearrangement process (block 115), and then sends the updated LLID list to all the other relay units RU.

On the other hand, if the reception is the first of this device number by the relay unit RU, the relay unit opens a new record on its own LLID list (block 116), triggers the LGID list rearrangement process (block 115), and sends the updated LLID list to all the other relay units RU.

If any item in the LLID list of any relay unit RU changes, then the entire LGID list is re-evaluated and analyzed to solve possible ambiguities, and to provide for unique assignments between the relay units and the devices. The LGID analysis and reorganization process is triggered in each relay unit RU either by detection of a change in its own LLID list, or by the reception of an LLID list from another relay unit RU over the high baud rate channel. If a change occurs in the LLID list of a relay unit RU, that relay unit further transmits its updated LLID list to all the other relay units. This leads to an iterative process that involves LLID message traffic among the relay units, and which ultimately stops after all the ambiquities between the device number assignments and the relay number have been resolved in each and every relay unit. When this occurs, the LGID lists in all the relay units are identical.

Figure 22:
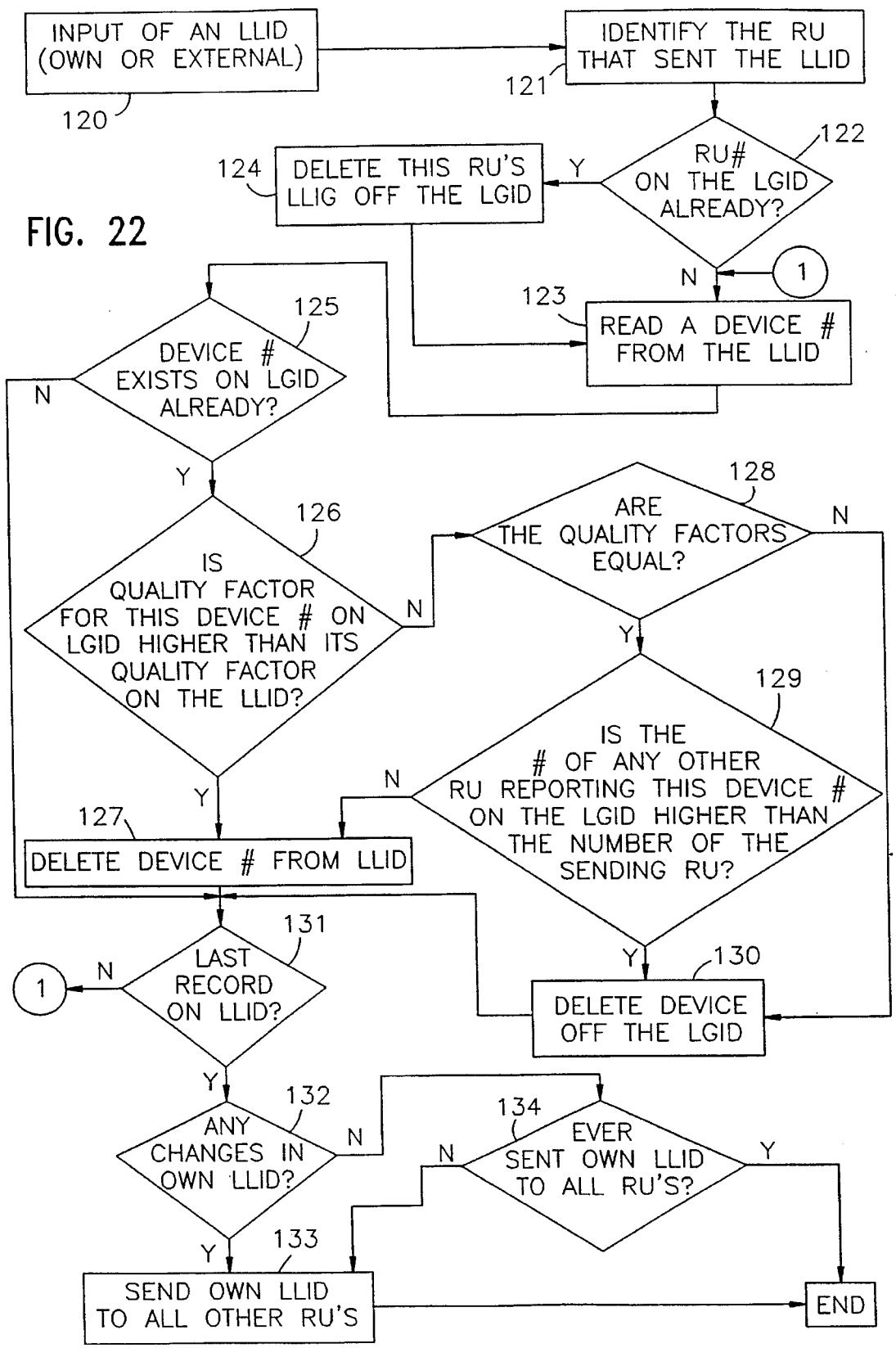
FIG. 22 is a flow chart illustrating the analysis and reorganization process of the list of globally intercepted devices (LGID) during the operation of the system.

FIG. 22 is a flow chart illustrating the analysis and reorganization process of the LGID.

Thus, upon the reception by a relay unit RU of an LLID list, which may be its own LLID list or that of another relay unit received over the high rate channel (block 120), the relay unit number associated with the received LLID list is identified (block 121). A determination is then made whether this relay unit number already appears on the LGID list (block 122). If not, a device number is read from the LLID list (block 123); but if so, the old LLID list of that relay unit is removed from the LGID list (block 124), and then a device number is read from the new LLID list.

A determination is then made whether this device number already appears on the LGID (block 125). If so, a determination is made whether the quality factor for this device number on the LGID is higher than the quality factor shown on the LLID (block 126). If it is of higher quality factor, the device number is deleted from the LLID (block 127). On the other hand, if the qualtity factors are equal (block 128), and there is no other relay unit reporting this device number on the LGID having a number higher than that of the sending relay unit (block 129), then the device number is deleted from the LLID (block 127). If the quality factors are equal, and if the number of any other relay unit reporting this device on the LGID is higher than the number of the sending relay unit, the device number is deleted from the LGID (block 130).

This process is repeated for each device on the LLID list until the last record thereon (block 131), whereupon a determination is made as to whether any changes have occurred in the relay unit's own LLID list (block 132). If a change has occurred, the relay unit RU sends its own LLID list over the high rate channel to all the other relay units (block 133). If no such change has occurred in its own LLID list as a result of this process, and its own LLID list had not previously been sent over the high rate channel (block 134), it then sends its own LLID list over the high rate channel to all the other relay units.

Figure 23:
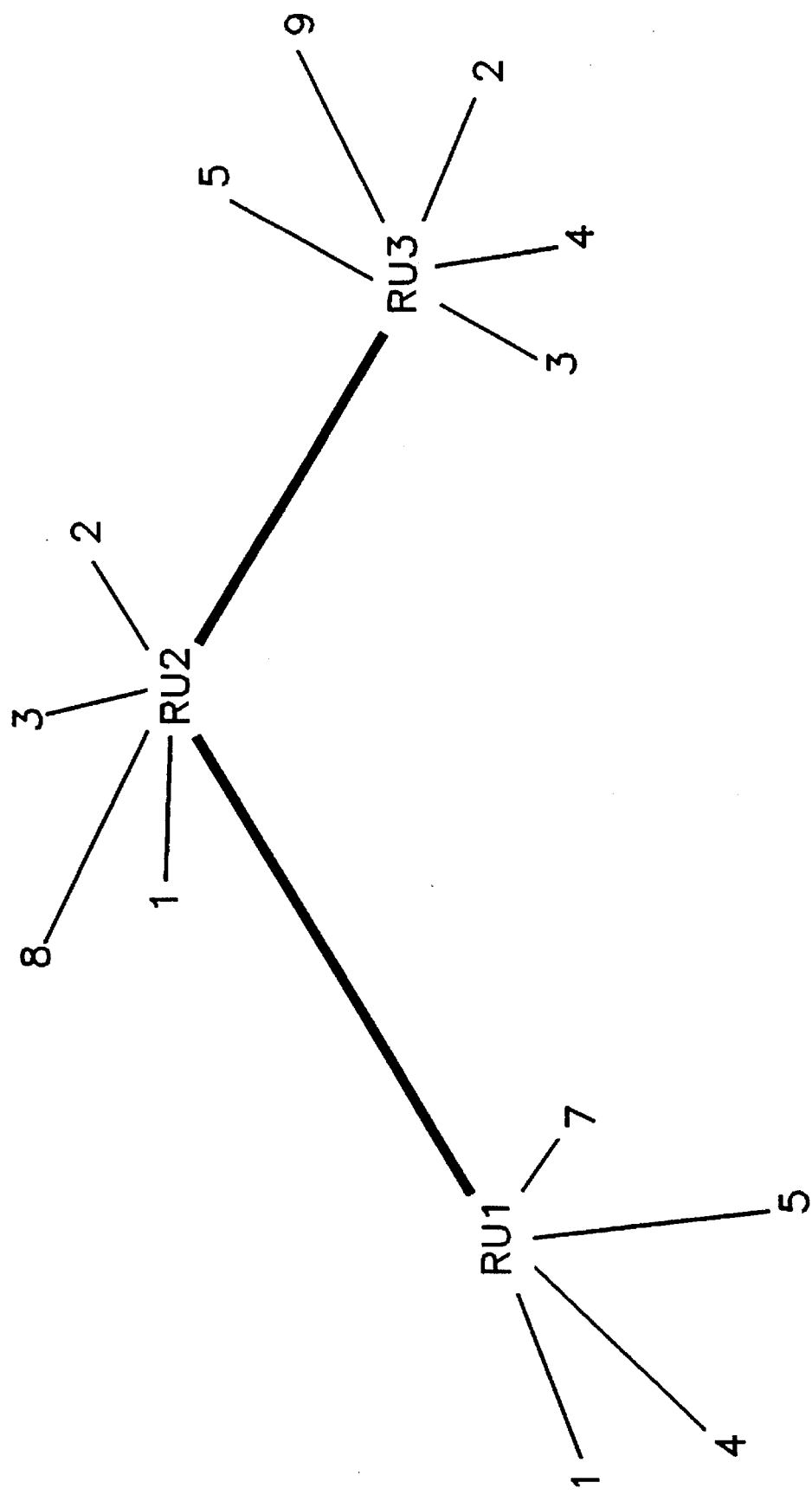
FIG. 23 diagrammatically illustrates a simple fiberless infrared communication network with three relay units each communicating with a plurality of devices.
Figure 24:
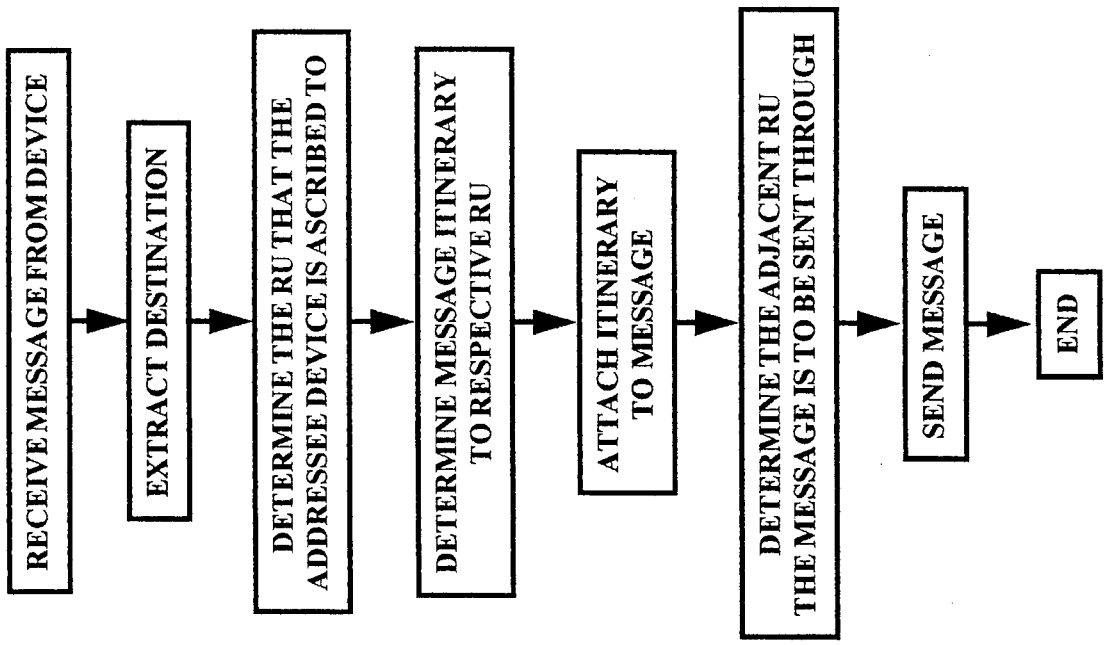
FIG. 24 is a flow chart illustrating the process of handling messages received from a device at a particular relay unit.
Figure 25:
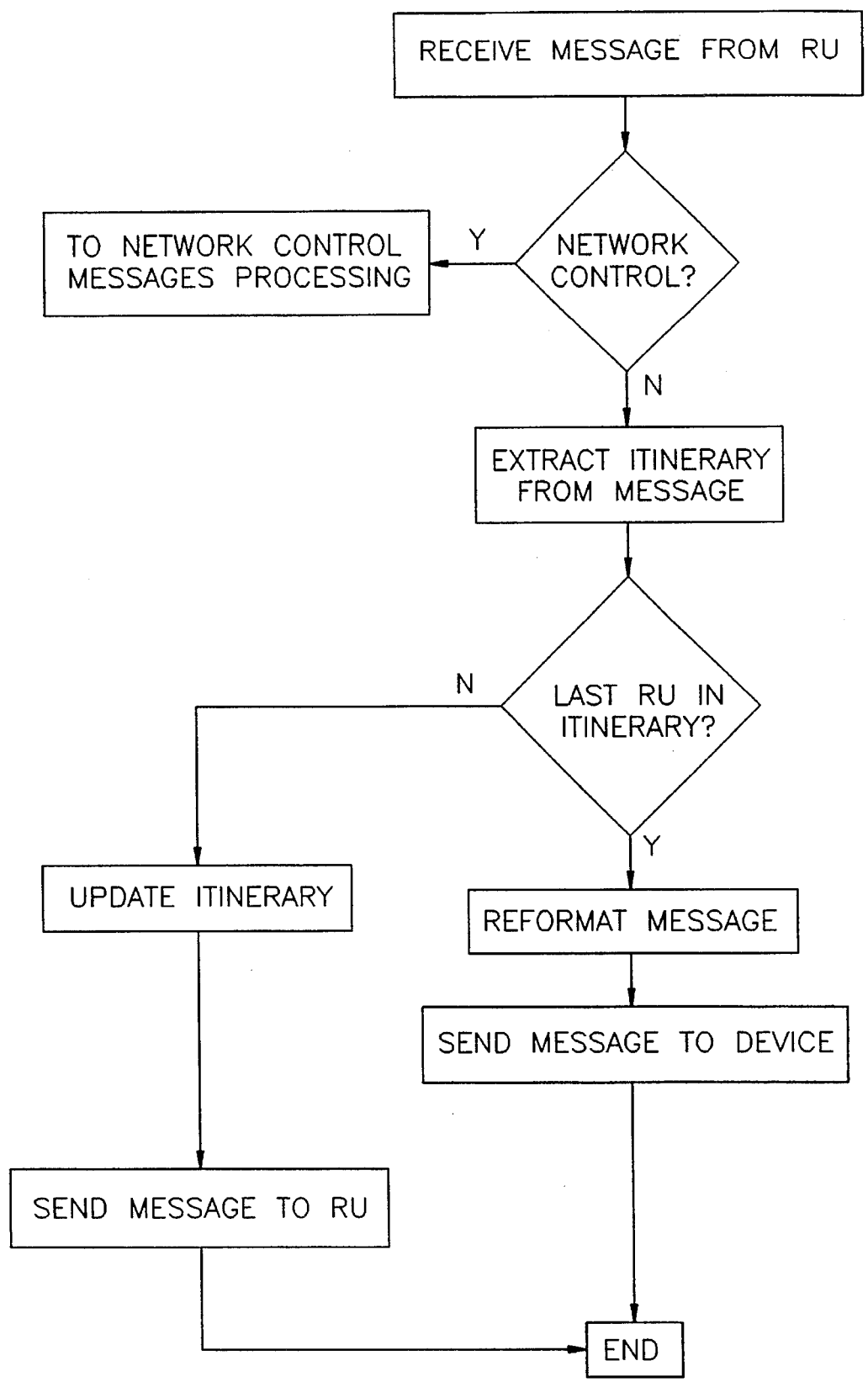
FIG. 25 is a flow chart illustrating the process of handling messages received from one relay unit at another relay unit.

FIG. 23 diagrammatically illustrates the foregoing process in a given moment in a simple arbitrary optical communication system involving three relay units $RU_1$–$RU_3$, with each relay unit serving four or five devices capable of communicating in this network. For the sake of simplicity, it is also assumed that the quality factors of all the receptions from all the devices are identical. Table 2 below shows, step by step, how the LGID lists are formed and updated as a result of the iterative LGID list analysis and reorganization process illustrated by the flow chart of FIG. 22 that results in identical LGID lists in all the relay units $RU_1$–$RU_3$.

TABLE 2

| ACTIVITY OVER THE HIGH RATE CHANNEL | RU #1 | RU #2 | RU #3 |
|---|---|---|---|
| — | INITIAL CONDITIONS: OWN LLID ONLY LGID RU #1: 1,4,5,7 | INITIAL CONDITIONS: OWN LLID ONLY LGID RU #2: 1,8,3,2 | INITIAL CONDITIONS: OWN LLID ONLY LGID RU #3: 4,5,9,2,3 |
| RU #2 SENDS ITS LLID TO ALL OTHER RU'S | UPON RECEPTION: LGID RU #1: 1,4,5,7 RU #2: 1,8,3,2 | LGID RU #2: 1,8,3,2 | UPON RECEPTION: LGID RU #3: 4,5,9,2,3 RU #2: 1,8,3,2 |

TABLE 2-continued

| ACTIVITY OVER THE HIGH RATE CHANNEL | RU #1 | RU #2 | RU #3 |
|---|---|---|---|
| | AFTER LGID ANALYSIS PROCESS: LGID RU #1: 1,4,5,7 - NO CHANGE IN OWN LLID RU #2: 8,3,2 | | AFTER LGID ANALYSIS PROCESS: LGID RU #3: 4,5,9 - CHANGE IN OWN LLID RU #2: 1,8,3,2 |
| DUE TO CHANGE IN OWN LLID, RU #3 TRANSMITS ITS OWN LLID TO ALL OTHER RU'S | UPON RECEPTION: LGID RU #1: 1,4,5,7 RU #2: 8,3,2 RU #3: 4,5,9 AFTER LGID ANALYSIS PROCESS: LGID RU #1: 1,4,5,7 - NO CHANGE IN OWN LLID RU #2: 8,3,2 RU #3: 9 | UPON RECEPTION: LGID RU #2: 1,8,3,2 RU #3: 4,5,9 AFTER LGID ANALYSIS PROCESS: LGID RU #2: 1,8,3,2 RU #3: 4,5,9 | LGID RU #3: 4,5,9 RU #2: 1,8,3,2 |
| RU #1 TRANSMITS ITS OWN LLID TO ALL OTHER RU'S | LGID RU #1: 1,4,5,7 RU #2: 8,3,2 RU #3: 9 | UPON RECEPTION: LGID RU #2: 1,8,3,2 RU #3: 4,5,9 RU #1: 1,4,5,7 AFTER ANALYSIS LGID RU #2: 8,3,2 - CHANGE IN OWN LLID RU #3: 9 RU #1: 1,4,5,7 | UPON RECEPTION: LGID RU #3: 4,5,9 RU #2: 1,8,3,2 RU #1: 1,4,5,7 AFTER ANALYSIS LGID RU #3: 9 - CHANGE IN OWN LLID RU #2: 8,3,2 RU #1: 1,4,5,7 |
| RU #2 AND RU #3 WILL TRANSMIT THEIR LLID'S BUT THIS WILL NOT CHANGE THE LGID'S | LGID RU #1: 1,4,5,7 RU #2: 8,3,2 RU #3: 9 | LGID RU #1: 1,4,5,7 RU #2: 8,3,2 RU #3: 9 | LGID RU #1: 1,4,5,7 RU #2: 8,3,2 RU #3: 9 |

Each relay unit RU issues periodically (at constant time intervals) an interrogation message over the high rate channel requesting a response and identification only from those relay units that intercept this message directly, i.e., without relaying. Any relay unit RU receiving such a message responds to it with an Acknowledge message that specifies its identification and the identification of the interrogator. Thus, the interrogating relay unit RU receives an appeal, and responds thereto, just from its immediate neighbour relay units.

For example, considering again the arbitray topology illustrated in FIG. 20, relay unit $RU_3$ would receive responses from relay units $RU_2$ and $RU_1$; similarly, all other relay units would receive responses as shown in Table 3 below:

TABLE 3

| RU NO. | RESPONSE FROM |
|---|---|
| 1 | 2 |
| 2 | 1,3 |
| 3 | 2,4 |
| 4 | 3,5,6 |
| 5 | 4 |
| 6 | 4,7,8,9 |
| 7 | 6 |
| 8 | 6 |
| 9 | 6 |

Just before issuing the next interrogation message, each relay unit RU sends its list of close neighbours to all the other relay units. Thus, each relay unit RU has the database that enables it to compute, using common and known sorting algorithms, the shortest itinerary for a message originated in one of the devices active over the network to another such device. For example, considering relay unit $RU_3$ in the above example, the itinerary list in its memory should look like Table 4 below:

TABLE 4

| DESTINATION | SEND TO | AND THEN TO | AND THEN TO |
|---|---|---|---|
| $RU_1$ | $RU_2$ | $RU_1$ | |
| $RU_2$ | $RU_2$ | | |
| $RU_4$ | $RU_4$ | | |
| $RU_5$ | $RU_4$ | $RU_5$ | |
| $RU_6$ | $RU_4$ | $RU_6$ | |
| $RU_7$ | $RU_4$ | $RU_6$ | $RU_7$ |
| $RU_8$ | $RU_4$ | $RU_6$ | $RU_8$ |
| $RU_9$ | $RU_4$ | $RU_6$ | $RU_9$ |

Now, when relay unit $RU_3$ receives a data message from device No. 7 that is addressed to device No. 13, it locates the relay unit number to which device No. 13 is assigned to in the LGID list, which is most likely $RU_8$. From the above itinerary list, it finds out that the message should pass through relay units $RU_1$, $RU_6$ and $RU_8$; and it compounds the message accordingly. In this way, the relay units on the way will delay the message minimum since its itinerary is appended to it.

Thus, at any moment, any relay unit RU holds the following information: (a) addition to or deletion of a specific device with respect to the network; (b) addition to or deletion of a specific relay unit RU with respect to the network; (c) affiliation with a specific relay unit for any given device in any moment; and the topographical deployment of the relay units in the entire network.

As described earlier, the messages carried in the low baud rate communication channel would be those between a relay unit RU and the devices serviced by it, whereas the messages carried on the high baud rate communication channel would be between different relay units. In both cases, the message types can be divided into two general categories: Information messages, and Administrative messages. Each message begins with a fixed length preamble field which provides for correct synchronization of the receiver and for direction of arrival detection. The preamble field is always followed by a fixed length message type field which specifies, in code form, the specific type of message to follow. This field is followed by various optional fields according to message type: originator, addressee, itinerary, and information if the message is of the information type. Each message always ends with a field that contains a CRC code (Cyclical Redundancy Code), and an end-of-message delimiter.

With respect to the low baud rate communication channel, an Information message would be one initiated at one device to be conveyed to another device in the network. Examples of such messages would include telephone conversations from a telephone base device TBD, an alarm from a fire/smoke detector device FSDD, etc.

The Administrative messages that may be involved in the low baud rate communication channel would include an Appeal message, which is issued periodically by every relay unit and is intended to detect operating devices in its cell that otherwise had not been previously active over the network. Upon the reception of an Appeal message, every powered device responds with a Response message, thus signalling its presence. For example, an appliance controlled by ACD normally receives commands and does not initiate transmissions; however, when it receives an Appeal message, it responds with a Response message identifying itself, to enable the relay units to detect the device.

Every device that receives a message from another device via the communication network responds to it by an Acknowledge message, which is conveyed back to the transmitting device by the network. It will thus be seen that whereas an Information message identifies both the originator device and the destination device, an Appeal message identifies neither, a Response message identifies the responding device, and an Acknowledge message identifies both the originator device and the destination device.

With respect to the messages in the high baud rate communication channel, these include Information messages from one relay unit to another, and also Administrative messages. The Information messages would include, in addition to the identification of the originating device and the destination device, also the itinerary of the message with respect to the relay units in the network.

One type of Administrative message carried in the high baud rate communication channel is an LLID list message, setting forth the Local List of Intercepted Devices, as described above. When a relay unit receives this type message, as so identified in the message type field, the message would be further transmitted by the respective relay unit to all its adjacent relay units except the one from which it received the message, in order to propagate the message further through the network.

Another type of Administrative message in the high baud rate communication channel is the Neighbour's Interrogation message. This message is initiated periodically by each relay unit (RU) as an appeal to detect and identify its adjacent relay units. Upon the receipt of such a message, each relay unit responds with a Neighbour's Response message to all the adjacent relay units except the one in the direction from which the Interrogation message had been received.

Every relay unit RU periodically re-evaluates its list of known neighbours based on responses it has received to its Neighbour's Interrogation messages, and periodically transmits a Neighbour's List message to the other relay units. In this manner, an identical network topology image is produced in every relay unit. Upon the reception by a relay unit of the LLID list messages, it stores it internally for further processing, and at the same time it transmits it over the high baud rate communication channel to all its adjacent relay units except that in the direction from which it was received.

Summary of Operation Of System and its Advantages

From the above description, it will be seen that the network may include a large number of devices of different types, such as fire/smoke detector devices FSDD, appliance control devices ACD, telephone base devices TBD, computer communication devices CCD, and portable control devices PCD to access all the above devices. The system further includes a plurality of relatively short-range relay units RU, each serving a plurality of the above devices. Each relay unit RU includes a low baud rate transceiver for communicating with the devices in its immediate surroundings (e.g., cell), and also a high baud rate transceiver for communicating between the relay units of different cells. Thus, when a message is to be transmitted from an originating device in one cell, e.g., to a destination device in another cell, the originating device transmits the message via infrared signals to the relay unit serviced by it over the low baud rate communication channel, whereupon the relay unit relays the message to an adjacent relay unit, via the high baud rate communication channel. The message is further relayed to the next adjacent relay unit on the shortest route to the destination device, and then to the next, etc. When the relay unit serving the destination device receives the message, it transmits it to the destination device via the low baud rate communication channel.

Each transceiver includes an omni-directional receiver including a three-dimensional array of receptors, and an omni-directional transmitter including a three-dimensional array of emitters. The emitters are controlled to transmit the messages in the proper direction and with a minimum of power, based on the direction-of-arrival of the signals detected by the receiver.

As also described above, each relay unit RU is a totally autonomous entity controlling and monitoring the devices in its respective cell without coordination from a central controller or computer. Thus, all the relay units build and maintain a list of all the devices in the network by having each relay unit monitor all the infrared transmissions in its surroundings and by having all the relay units exchange this information and process it in a similar way to construct an identical network topology in every relay unit. Based on the quality and direction of the transmissions it intercepts, each relay unit builds internally a list of locally intercepted devices (LLID) that are present in its cell and updates this periodically. In addition, each relay unit maintains and updates a list of globally intercepted devices (LGID) listing all the devices in the network.

Following are some of the advantages provided by the described infrared fiberless communication network:

Each relay unit RU is fully autonomous and self-contained. Thus, the entire network is regenerative in case of failure of a relay unit, minimizing damages in such a case. Traffic volume is always kept as small as possible to avoid redundancy. Relay units may be added or removed dynamically, with the entire network adjusting itself to the changes automatically. In addition, devices may change place in real time, may turn on or turn off at random, while the network monitors their movement and their appearance/disappearance on the network without posing interference to the communication.

The invention has been described with respect to one preferred embodiment, but it will be appreciated that this is set forth merely for purposes of example, and that many other variations, modifications and applications of the invention may be made.

What is claimed is:

1. An infrared communication system including a plurality of infrared transceivers for receiving and transmitting infrared signals through the free air, each of said transceivers comprising:

an omnidirectional infrared receiver for receiving infrared signals;

an omnidirectional infrared transmitter for transmitting infrared signals;

and a controller including signal direction-of-arrival determining means for determining the direction of arrival and the quality of the signals received by the infrared receiver, and direction controlling means for controlling the respective infrared transmitter in accordance therewith.

2. The system according to claim 1, wherein:

said infrared receiver includes an array of infrared signal receptors;

and said signal direction-of-arrival determining means of said controller includes a plurality of differential circuits for producing differential outputs of oppositely-oriented receptors, and processing means for utilizing the differential output having the largest absolute value for determining the direction of arrival of the signal received by the infrared receiver.

3. The system according to claim 2, wherein said processing means includes:

a threshold detector receiving the outputs of all said differential circuits and for comparing same with a predetermined threshold;

a timing gate triggered by the output of the threshold detector when first receiving an output from a differential circuit exceeding the threshold value and effective to pass the outputs of the differential circuits for a predetermined time interval from the time of triggering the timing gate and to block said outputs thereafter;

an integrator circuit for integrating the outputs of the differential circuits until blocked by said timing gate;

and a maximum signal detector for detecting the differential circuit outputting the highest integrated value and for thereby providing an indication of the direction of the signal received by the infrared receiver.

4. The system according to claim 1, wherein said controller also includes power controlling means for controlling the radiation power and direction of the infrared transmitter in the respective transceiver.

5. The system according to claim 4, wherein said infrared transmitter includes an array of infrared signal emitters; and said power and direction controlling means includes:

means for selecting a combination of the signal emitters in the array to be energized;

and means for comparing the electrical current applied to the energized signal emitters with a permitted maximum, and if exceeded, for selecting a different combination of signal emitters to be energized.

6. The system according to claim 5, wherein said power controlling means further includes:

a controllable current source supplying electrical current for energizing said array of signal emitters;

a counter for counting each time a different combination of emitters is selected;

a comparator for comparing the count of said counter with a permissible maximum;

and a circuit for reducing the output of said controllable current source whenever said counter exceeds a predetermined number.

7. The system according to claim 1, wherein said controller further includes:

means for detecting the destination of the infrared message to be transmitted by the transmitter in the respective transceiver;

means for recording the direction of arrival, quality and originator identity of formerly received messages;

means for comparing the originator identity of each received infrared message with all the previously-recorded originator identities for the respective transceiver;

and means for controlling the transmitter in the respective transceiver such that when the destination of an outgoing message matches the originator of one of the previously-recorded messages, the transmitter is caused to transmit unidirectionally in the direction corresponding to the matched previously-recorded originator; and when the destination of an outgoing message does not match one of the previously-recorded originators, the transmitter is caused to transmit omnidirectionally.

8. The system according to claim 7, wherein said controller controls the transmitter to transmit less power when it transmits unidirectionally than when it transmits omnidirectionally.

9. The system according to claim 8, wherein:

said infrared receiver further includes means for detecting errors in the infrared signals received by the respective transceiver;

and wherein said controller further includes means for controlling the transmitter in the respective transceiver such that when the received signal is relatively error-free, the transmitter transmits unidirectionally and with relatively low power, and when the received signal is not relatively error-free, the transmitter transmits omnidirectionally and with relatively high power.

10. The system according to claim 1, wherein said controller also includes:

means for causing the transmitter of the respective transceiver to transmit an Acknowledge message upon receipt of a signal by its receiver;

and means effective upon failure of the receiver to receive an Acknowledge message within a predetermined time interval of the transmission of a signal from its transmitter, for making another attempt, and upon such failure in a predetermined number of attempts, for declaring a connection failure.

11. The system according to claim 1, wherein:

said infrared transceivers are included in a plurality of relay units each communicating with its adjacent relay units, and in a plurality of electrical devices each communicating with the relay unit in its vicinity;

said transceivers in each of said relay units including a high baud rate infrared transceiver for communicating with its adjacent relay units, and a low baud infrared transceiver for communicating with the each of said electrical devices in its vicinity.

* * * * *